Figure 1:
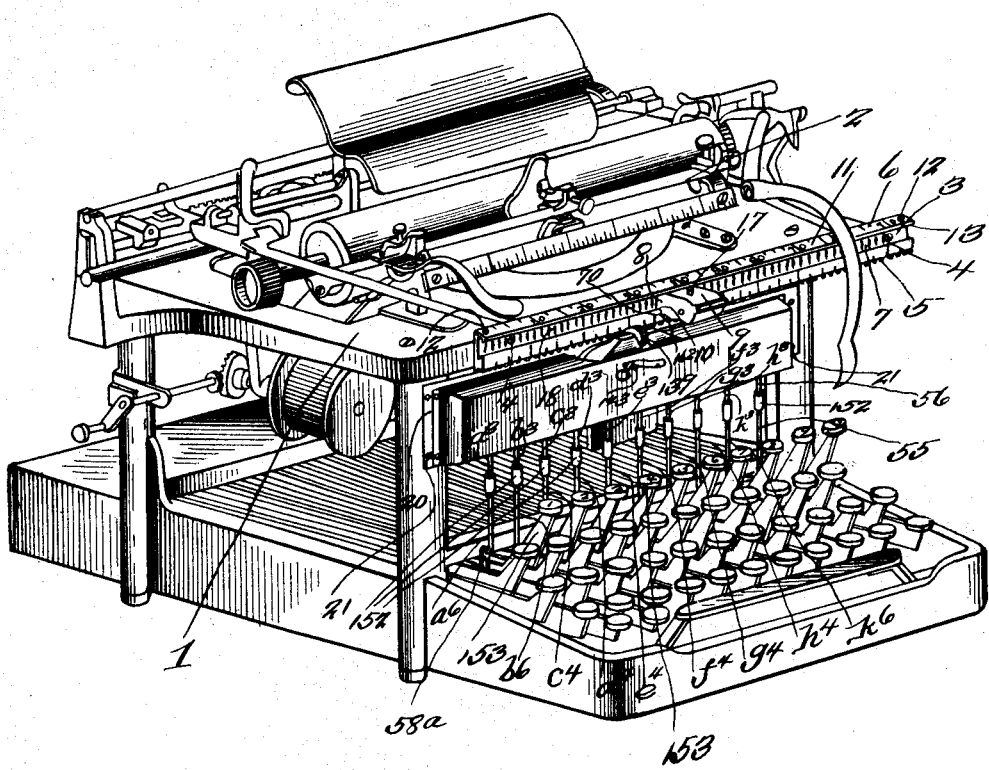

O. A. DIETSCHE.
CALCULATING ATTACHMENT FOR TYPE WRITERS.
APPLICATION FILED FEB. 18, 1913.

1,203,858.

Patented Nov. 7, 1916.
10 SHEETS—SHEET 1.

Witnesses
Rohe Meyer
Francis L. Boswell

Inventor
O. A. Dietsche,
By D. Swift & Co.,
his Attorneys

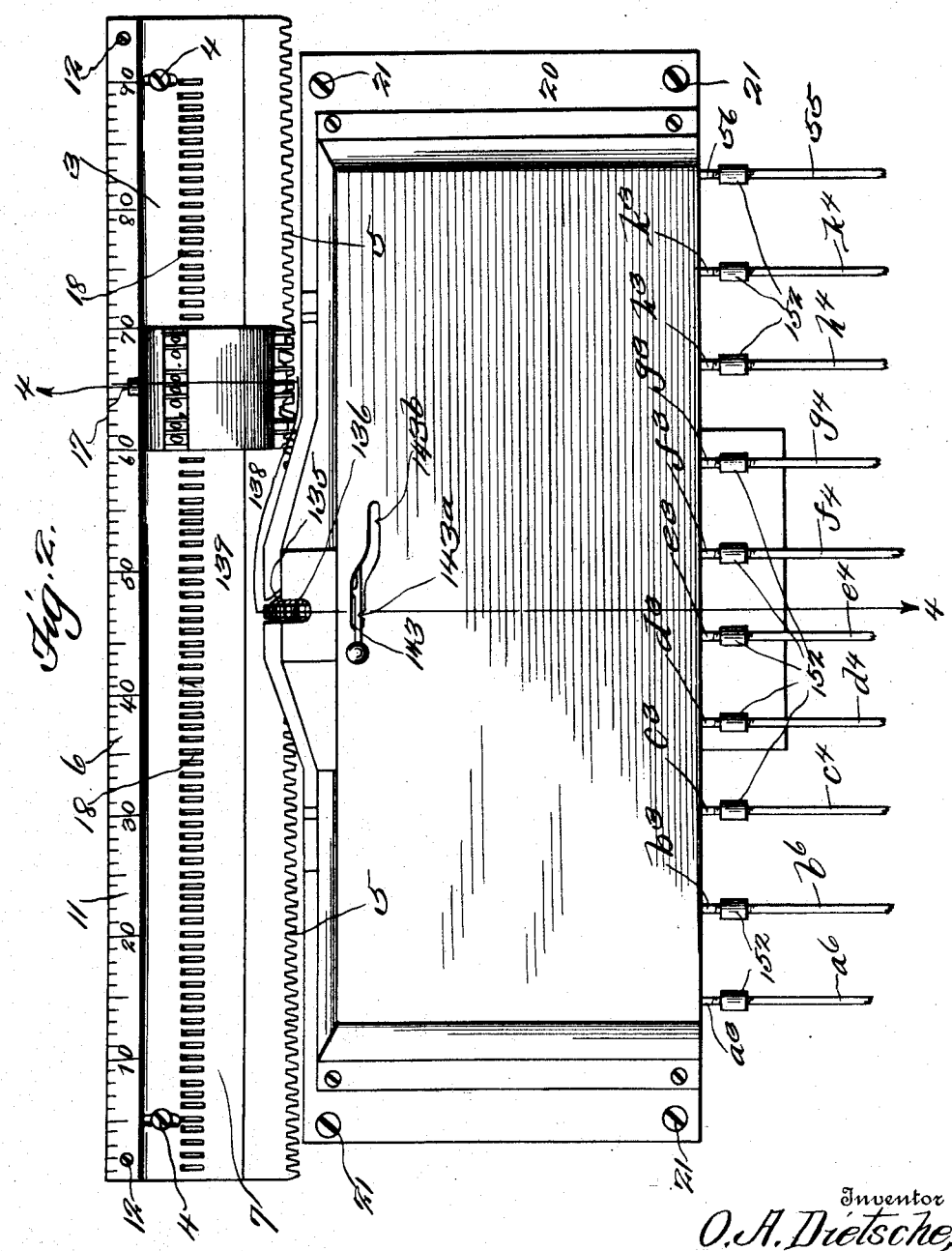

O. A. DIETSCHE.
CALCULATING ATTACHMENT FOR TYPE WRITERS.
APPLICATION FILED FEB. 18, 1913.
1,203,858.
Patented Nov. 7, 1916.
10 SHEETS—SHEET 3.
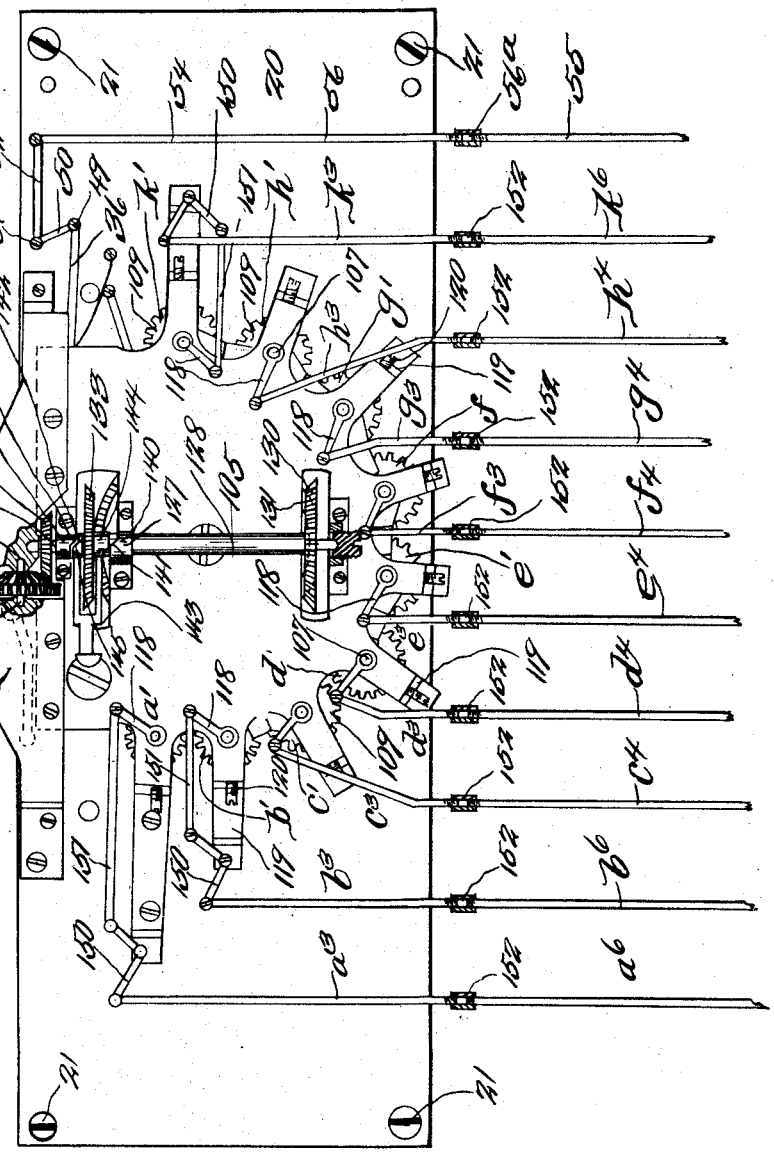

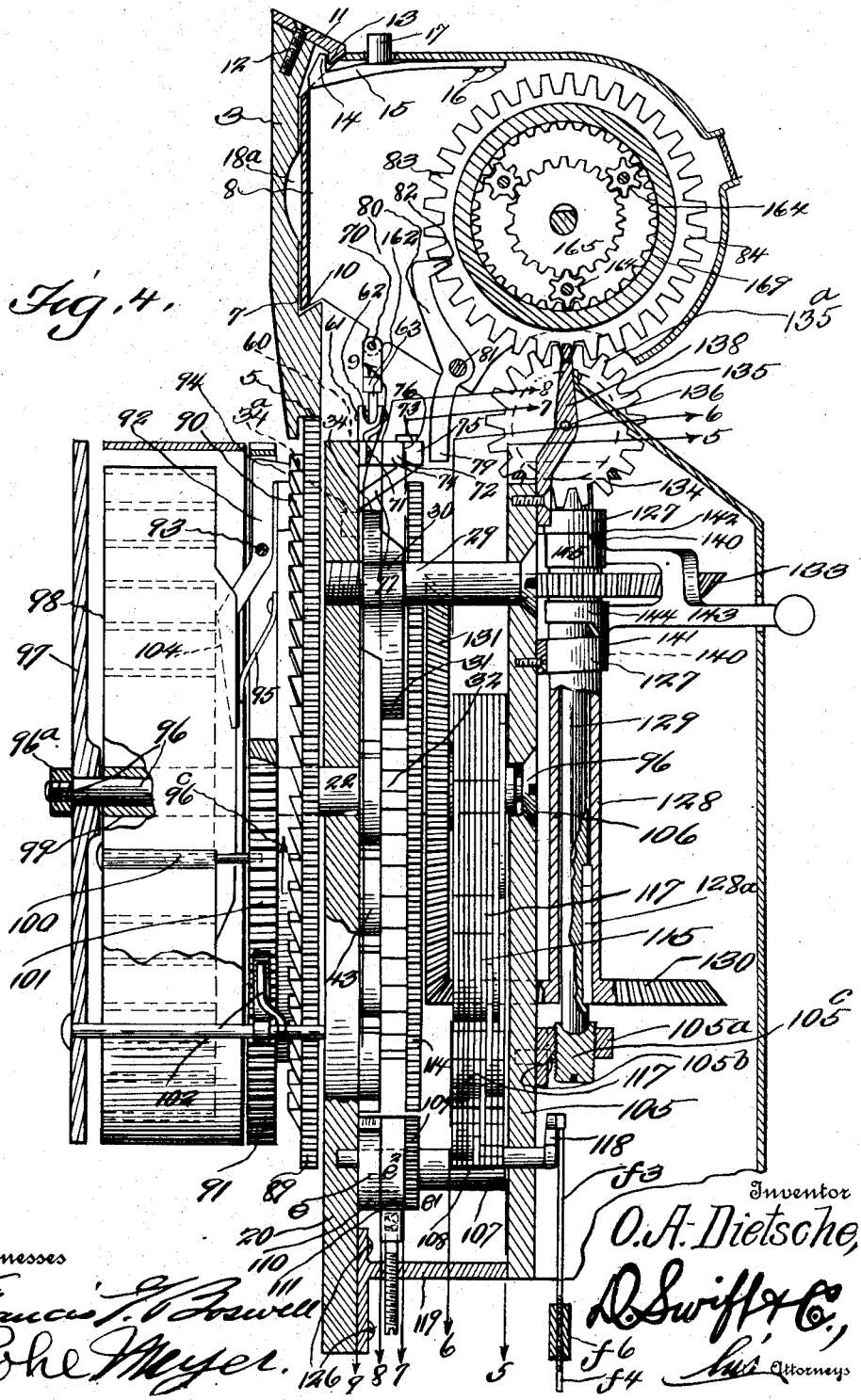

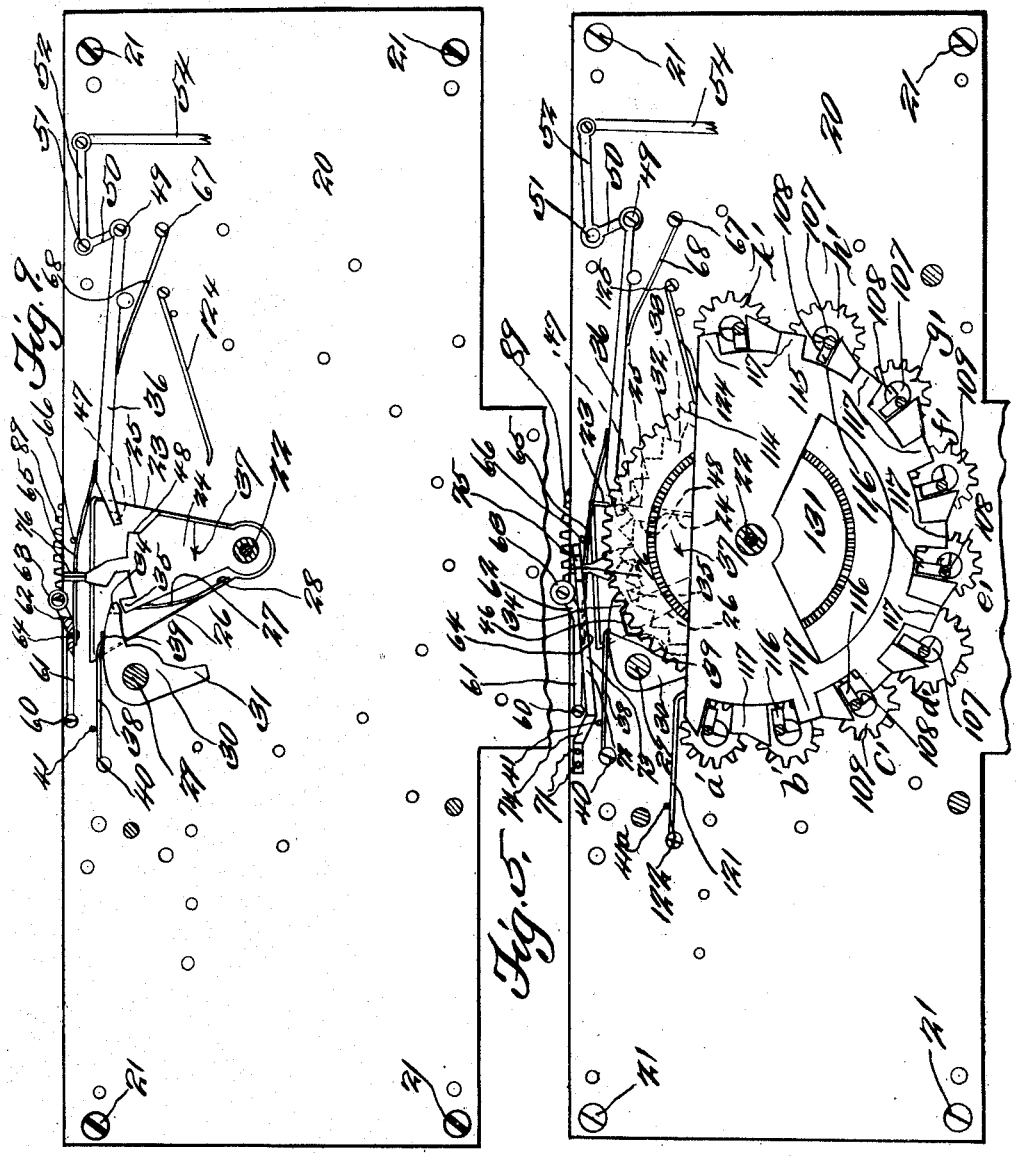

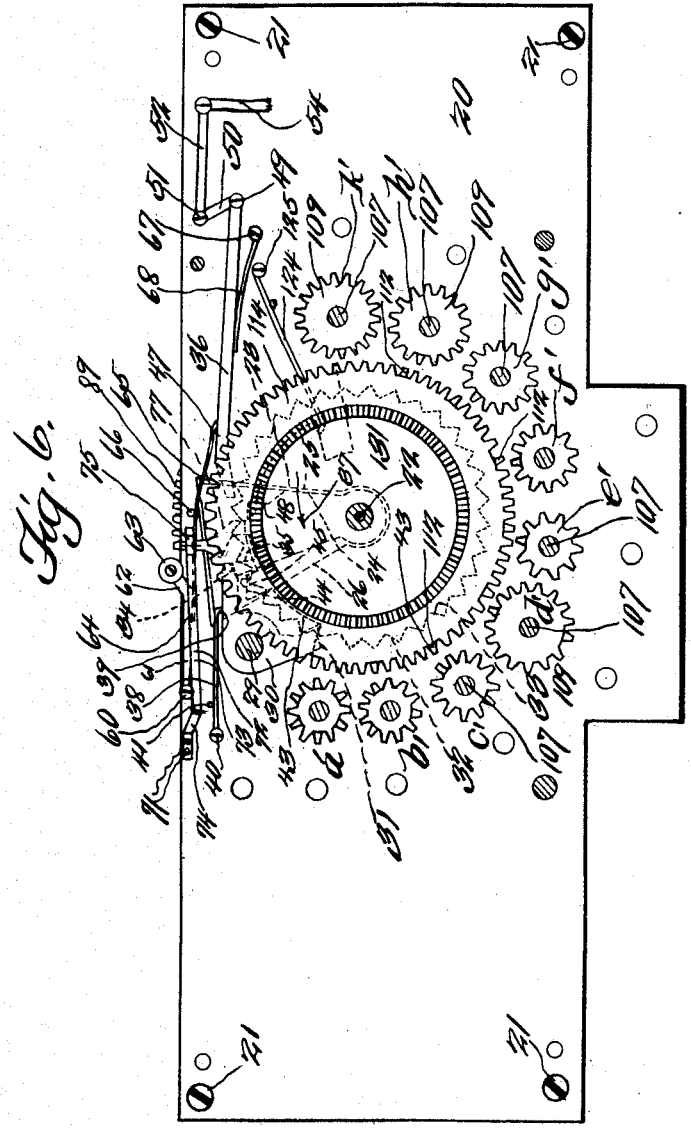

O. A. DIETSCHE.
CALCULATING ATTACHMENT FOR TYPE WRITERS.
APPLICATION FILED FEB. 18, 1913.
1,203,858.
Patented Nov. 7, 1916.
10 SHEETS—SHEET 7.
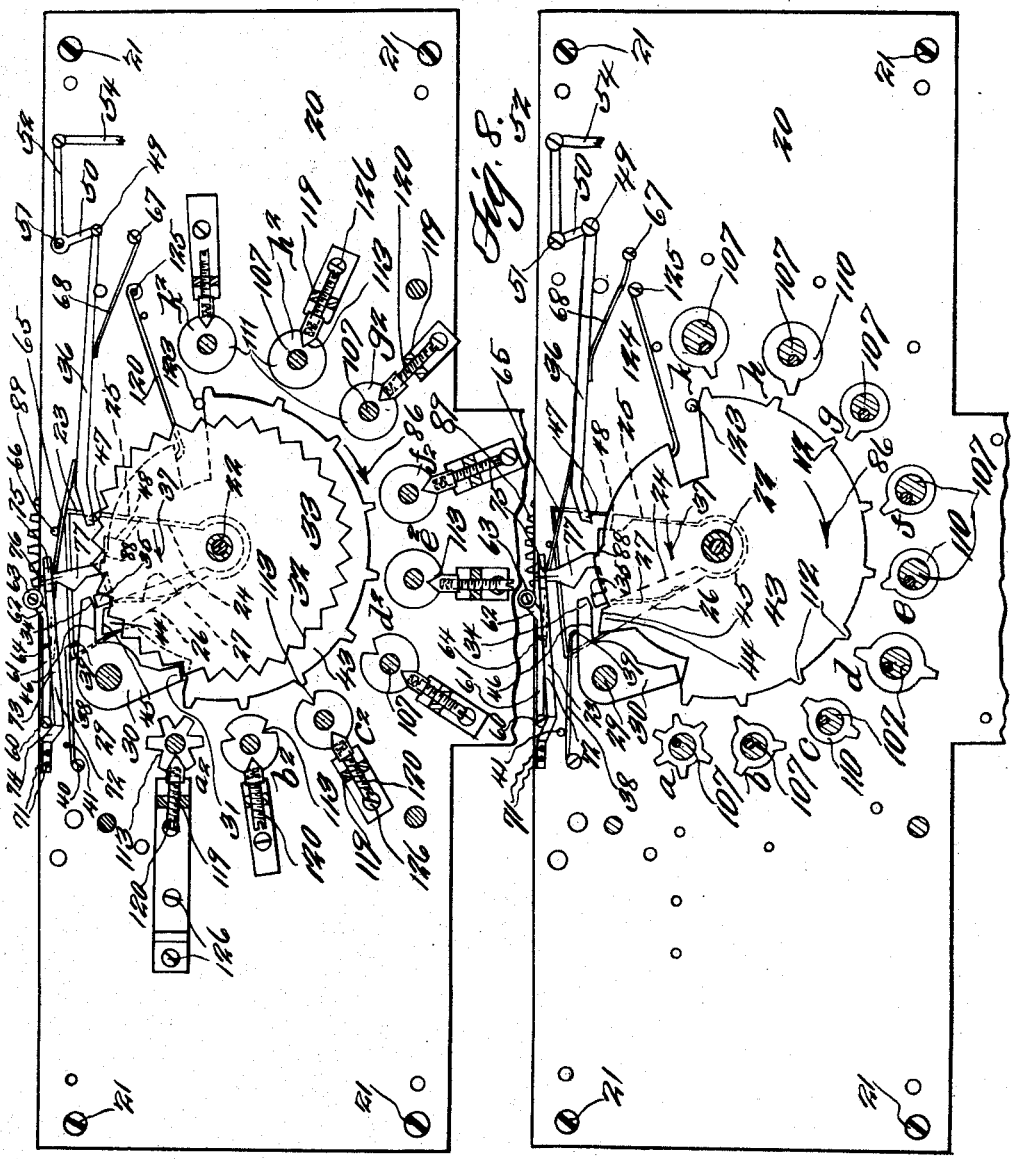
Witnesses
Frances L. Boswell.
Mark DeGrange.
Inventor
O. A. Dietsch
By D. Swift & Co.,
his Attorneys

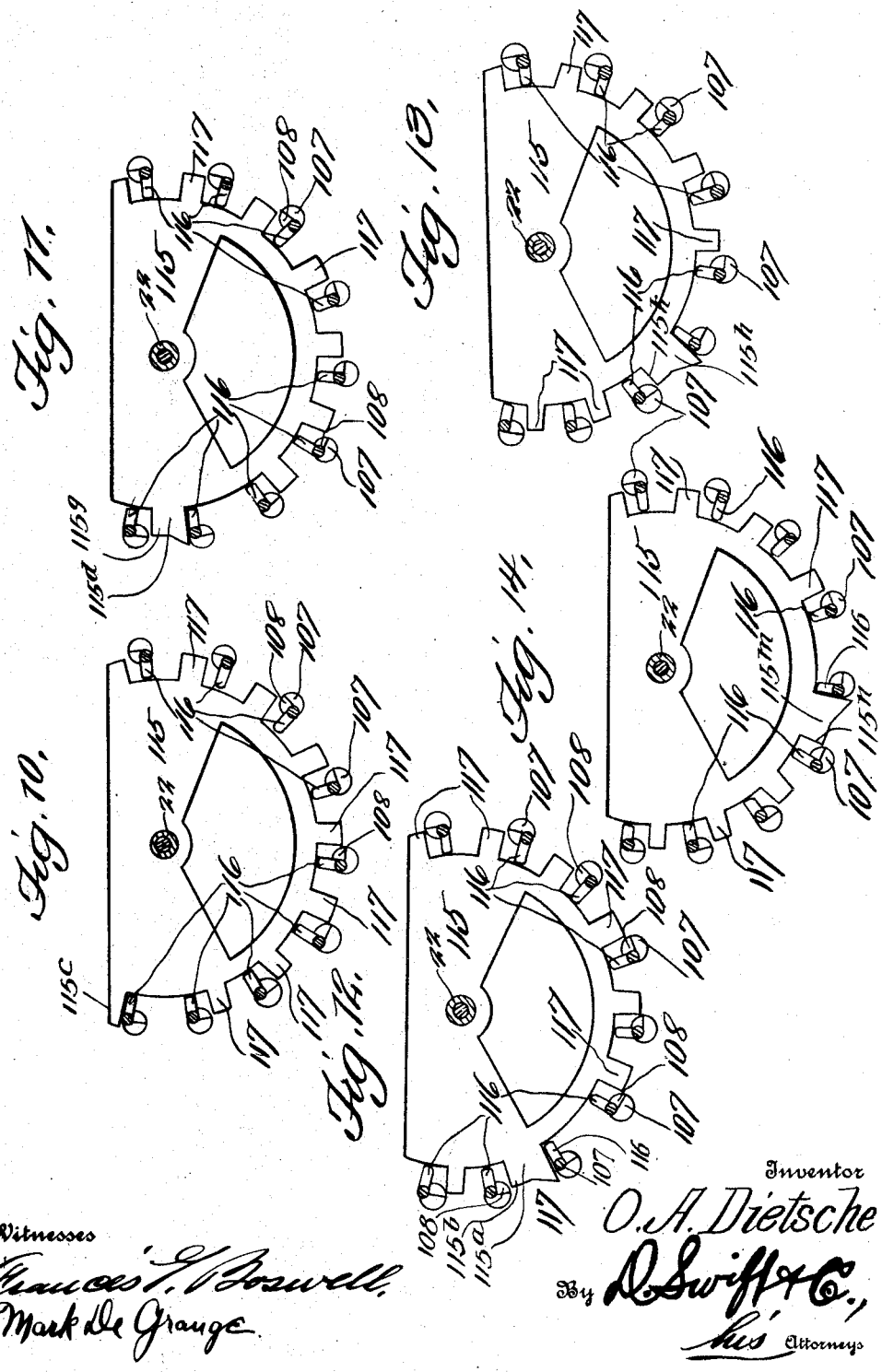

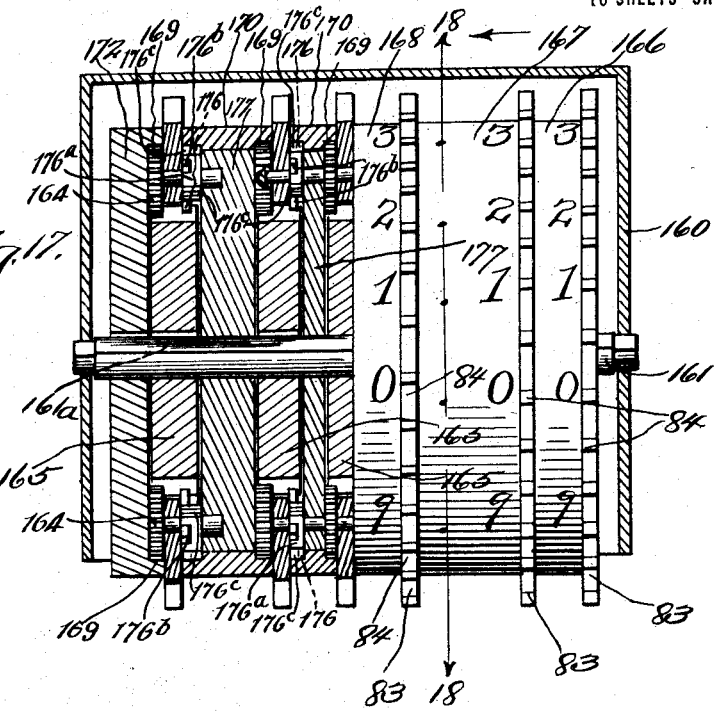
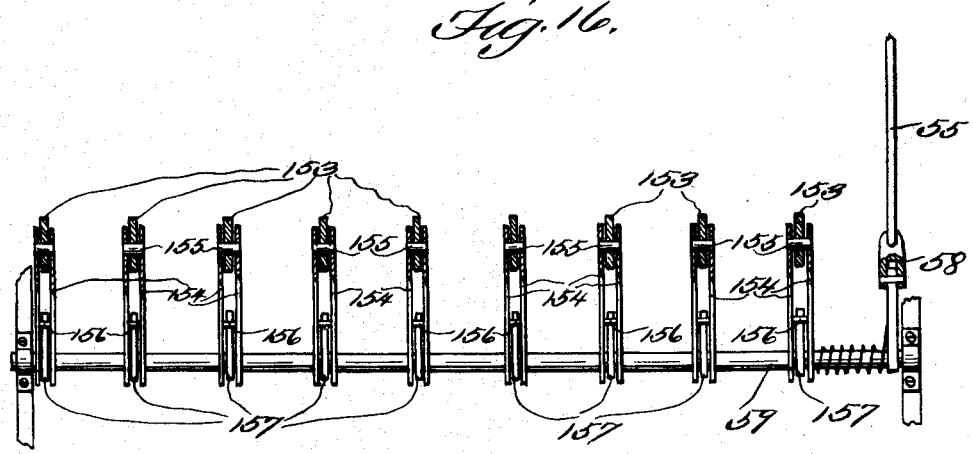

O. A. DIETSCHE.
CALCULATING ATTACHMENT FOR TYPE WRITERS.
APPLICATION FILED FEB. 18, 1913.
1,203,858.
Patented Nov. 7, 1916.
10 SHEETS—SHEET 10.
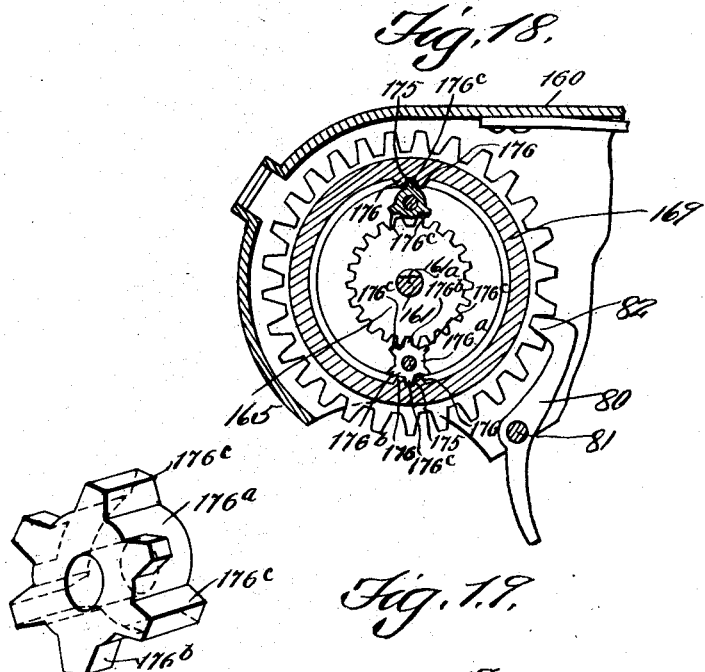
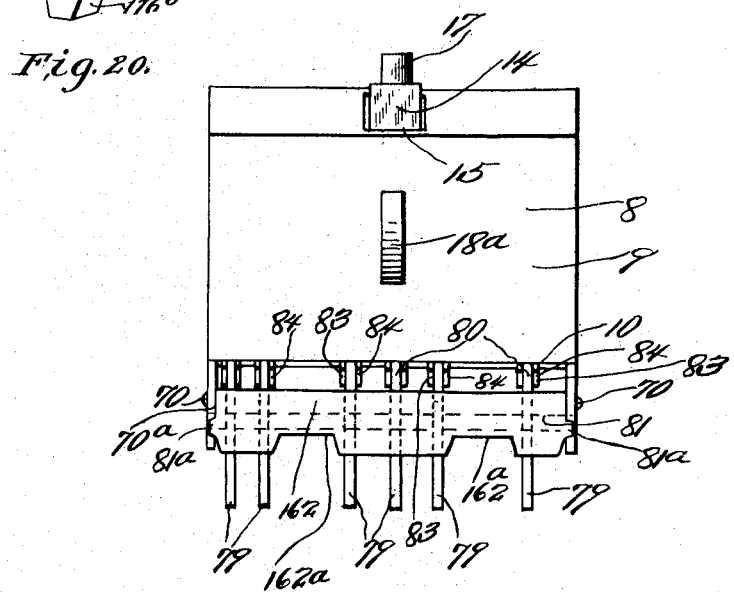
Witnesses
Rohe Meyer
Francis T. Boswell
Inventor
O. A. Dietsche
By D. Swift & Co.
his Attorneys

UNITED STATES PATENT OFFICE.

OSCAR A. DIETSCHE, OF GLADSTONE, NORTH DAKOTA.

CALCULATING ATTACHMENT FOR TYPE-WRITERS.

1,203,858.   Specification of Letters Patent.   Patented Nov. 7, 1916.

Application filed February 18, 1913. Serial No. 749,099.

*To all whom it may concern:*

Be it known that I, OSCAR A. DIETSCHE, a citizen of the United States, residing at Gladstone, in the county of Stark and State of North Dakota, have invented a new and useful Calculating Attachment for Type-Writers; and I do hereby declare the following to be a full, clear, and exact description of the invention, such as will enable others skilled in the art to which it appertains to make and use the same.

This invention relates to the art of calculating machines, and particularly to a new and useful calculating attachment particularly adapted for use in connection with typewriters.

In its broadest scope the invention aims to provide a totalizing device adjustably carried by a rule of the carriage of a typewriter, and an improved mechanism having such connections with the numerical keys of the typewriter, so that when the totalizer is adjusted so as to be operated by said mechanism, and so that when columns of figures, say for instance, from one to six figures deep, are written on the sheet in the typewriter, the amount, at the completion of the column will be totaled on the totalizer, and which total may then be written on the sheet in the typewriter, by operating the numerical keys in the usual manner.

A further object of the invention is to provide an improved mechanism so connected to and coöperating between the numerical keys of the typewriter and a totalizer, so that every individual key, excepting the one which is being operated or depressed, is automatically locked. For example, when the key having the numeral 1 thereon is depressed, thereby causing the totalizer to disclose the numeral 1, said mechanism includes means automatically actuated by depressing the key having the numeral 1, for locking the remaining numerical keys of the typewriter, thereby preventing any two keys being actuated at the same time.

The invention comprises further features and combination of parts, as hereinafter set forth, shown in the drawings and claimed.

Figure 15:
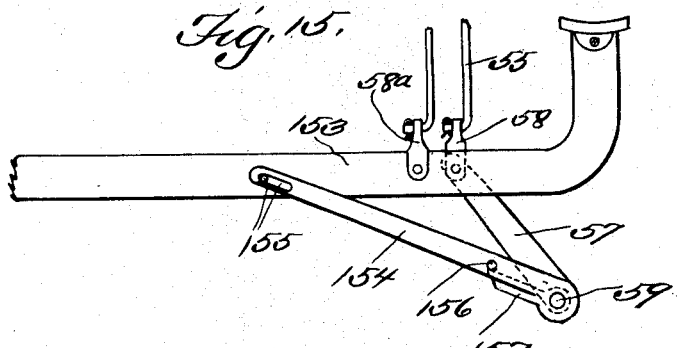

In the drawings: Figure 1 is a view in perspective of a conventional form of a typewriter, showing the improved adding and substracting machine as applied thereto. Fig. 2 is an enlarged view in elevation of the adding and substracting machine, showing the same in conjunction with a rule of the typewriter carriage, and showing the totalizer. Fig. 3 is a view in elevation showing the cover plate of the adding and subtracting machine removed, disclosing some of the essential parts of the machine. Fig. 4 is a sectional view on line 4—4 of Fig. 2. Fig. 5 is a sectional view on line 5—5 of Fig. 4, showing certain parts in elevation. Fig. 6 is a sectional view on line 6—6 of Fig. 4, showing the parts in elevation. Fig. 7 is a sectional view on line 7—7 of Fig. 4, showing certain features in elevation. Fig. 8 is a sectional view on line 8—8 of Fig. 4. Fig. 9 is a sectional view on line 9—9 of Fig. 4. Fig. 10 is a detail view showing one of the locking plates for locking all the number keys excepting key No. 1. Fig. 11 is a detail view showing one of the locking plates, for locking all the number keys excepting key No. 2. Fig. 12 is a detail view showing one of the locking plates, for locking all the number keys excepting key No. 3. Fig. 13 is a detail view showing one of the locking plates, for locking all the number keys excepting key No. 4. Fig. 14 is a detail view showing one of the locking plates, for locking all the number keys, excepting key No. 5. Fig. 15 is a detail view showing one of the keys with its connection to the shaft 59. Fig. 16 is a detail view showing the series of number keys with their connections to the shaft 59. Fig. 17 is an enlarged detail sectional view of the totalizer. Fig. 18 is a sectional view on line 18—18 of Fig. 17. Fig. 19 is a rear view of the totalizer. Fig. 20 is a detail perspective view of one of the pinions 176$^a$.

Referring more particularly to the drawings 1 designates a conventional form of typewriter having the usual reciprocating carriage 2, to which a rule 3 is secured at 4. The rule 3 at its lower edge is provided with a series of rack teeth 5 and at its upper edge a plurality of graduations 6, of the character usually used upon typewriter carriages, for gaging the position of the same. This rule 3 is provided with a longitudinal dove-tailed groove 7, which receives a projection 8 of the usual form of totalizer 9, such as that shown in Figs. 1, 2, 4, 17, 18 and 19 and the detail construction and operation of which totalizer will be hereinafter set forth. This projection 8 at its lower end corresponds in construction to the lower portion of the dove-tailed groove 7, as shown at 10, so as to fit the groove. However, the graduations 6 are formed on the bar 11, which is secured to the rule 3 by the screws 12. This bar 11 is provided with an overhanging portion 13, behind which the nose 14 of the spring dog 15 (which is secured at 16 to the totalizer) engages, so as to hold the totalizer connected to the rule. The above structure for securing the totalizer to the rule is more clearly shown in Figs. 4 and 19. To detach the totalizer the spring dog 15 may be depressed by the operator applying pressure upon the lug 17.

The rule 3 is provided with a series of recesses 18, each of which receives a projection 18ª on the casing and the totalizer 9, as shown in Fig. 4, thereby holding the totalizer in place relative to the rule, and to be operated by an operating mechanism, irrespective of the position of the carriage of the typewriter. Each of the recesses 18 is arranged opposite each graduation 6 and each tooth of the rack 5, in order that the totalizer 9 may be set accordingly, and with respect to the carriage of the typewriter, and in order that one or another of the major gears of the carrying mechanism of the totalizer may mesh or engage with the gear 135ª of the mechanism for operating the totalizer, whereby addition and subtraction may be accomplished. A mechanism for operating the totalizer is mounted upon a plate 20, which is secured to the frame of the typewriter, there being a suitable housing for inclosing said mechanism, and a detail description of the various parts of this mechanism will be hereinafter set forth. A suitable spring motor (the operation and construction of which will be hereinafter set forth) is included in this mechanism, for co-operating with and controlling various elements of the mechanism. Therefore as one or another of the numerical keys of the typewriter is depressed, the typewriter carriage will move to the proper position, in order that the number or numeral of the key depressed will impart its impression on the paper of the platen of the typewriter, and when moving the carriage in this manner the totalizer will likewise be moved, so that its proper major gear of its carrying mechanism will mesh with the gear 135ª, in order that the number of the key depressed will be totaled on the totalizer. However, in adjusting the totalizer in a position to be operated by said mechanism, the lever dog 162 must be disposed vertically, as shown in full lines in Fig. 4, in order to engage the roller 63, thereby depressing the spring 65 against the lever arm 36, which will depress the lever arm 36 against the action of the spring 68, in order that when one or another of the numerical keys is depressed the lever arm 36 will move laterally, and in the direction toward the shoulder 48 of the locking plate 24. Unless the lever dog 162 is thus disposed, the lever arm 36 will idly operate, and the numerical key that is depressed would merely impart its impression on the paper of the platen, without causing said mechanism to operate the totalizer. This mechanism upon the base plate 20, as before stated, is primarily for the purpose of operating the totalizer, the totalizer having means, such as the lever dog 162, adapted to be adjusted or thrown in such position, to determine whether or not said mechanism shall operate the totalizer. In other words, the totalizer controls the operation of the mechanism, and in controlling the operation of such mechanism, said mechanism not only controls the operation of the numerical keys, in so far as locking and unlocking them automatically, but it also controls the movement of the carriage through the medium of the motor, which motor constitutes spring means for the various elements of the mechanism. This mechanism includes a sleeve shaft 22, which is mounted in a bearing of the plate 20 (which is secured to the frame of the typewriter by the screws 21) and through the sleeve shaft 22 the screw bolt 96 extends, thereby supporting the sleeve shaft in place, and by means of the head of the screw bolt and the nut 96ª on the end of the screw bolt 96 the shield plate 97 and the plate 105 are held supported on the plate 20. As shown in Fig. 9 of the drawings, the plate 20 is constructed with a recess 23, substantially of a triangular contour, and which recess 23 receives a locking plate 24. Later on in the specification it is fully stated how this locking plate operates to lock the keys, and how it is operated to unlock the keys so that the totalizer may be operated. This locking plate 24 is mounted loosely upon the shaft 22, and is adapted to have limited movement between the sides 25 and 26 of the recess 23 as clearly shown in Fig. 9. A spring 27 secured at 28 acts to normally hold the locking plate 24 against the side 25 of the recess 23.

Secured to the plate 20 by means of a screw 29 is a dog 30, the tail 31 of which is designed to engage the teeth 32 of the power ratchet wheels 33, which is stationary on or movable with the shaft 22 as shown clearly in Figs. 5, 6, 7 and 8 and 9. The nose portion 34 of the dog 30 extends laterally and into the recess 23 of the plate 20, and behind which the arm 35 of the locking plate 24 engages, that is, when the said locking plate 24 is actuated against the action of the spring 27, by means of the lever arm 36 as shown in Fig. 9. This engagement is accomplished automatically, owing to the spring 38 bearing against the dog at 39 and secured at 40 to the plate 20 (reference being had to Fig. 9). There is a pin 41, in contact with which the spring 38 is arranged, in order to increase the action of the spring, as well as insuring the proper engagement of the nose 34 with the arm 35. To disengage the nose and arm 34 and 35, a disk wheel 43 mounted upon the shaft 22 is provided. This wheel 43 is constructed with a radial projection 44 having an inclined edge 45 adapted to contact with the body 46 of the nose 34, so as to lift it from the path of the arm 35, which will allow the locking plate 24 to return to its normal position owing to the spring 27 so as to again be actuated by the lever arm 36 as shown in Figs. 5, 6, 7, 8 and 9. The manner in which the wheel 43 is operated will be hereinafter set forth. When the lever arm 36 is operated, the end 47, which is turned into the recess 23, contacts with the shoulder 48 of the locking plate 24, and when the arm 36 is operated the same is moved in the direction of said plate. The lever arm 36 is pivoted at 49 to the lever 50, which is in the form of a bell crank lever and pivoted at 51 to the plate 20 (Figs. 5 and 9). To the arm 52 of the bell crank lever 50 a rod 54 is pivotally connected. This rod 54 consists of two sections 55 and 56, the section 55 is in turn connected to the arm 57 by means of the link 58 as shown clearly in Figs. 2 and 3. This arm 57 rocks with a shaft 59, and when rocked, in the manner to be hereinafter set forth, the arm 57 will move downwardly, thereby rocking the bell crank lever 50, which in turn will reciprocate the lever arm 36 in a direction, so that the nose 47 will engage the shoulder 48 of the locking plate 24. Pivoted at 60 to the plate 20 is an arm or lever 61, the free end portion of which terminates in an angularly disposed portion 62 having a roller 63 shown plainly in Figs. 9 and 5. Secured at 64 to the lever 61 is a spring 65, the free end of which engages the lever arm 36, there being a pin 66 on the plate 20 for holding the spring 65 in position. Secured to the plate 20 as at 67 is a spring 68, which is designed to engage the opposite or under side of the lever arm 36. This spring 68 almost equalizes the spring action or tension of the spring 65 also shown in Fig. 9. When a totalizer is set for adding, a lever dog 162 pivoted at 70 to the frame of the totalizer is disposed in a vertical position, as shown in dotted lines in Fig. 4, so as to engage the roller 63, so as to depress the lever 61, and when depressed the lever arm 36 is in turn depressed, so that its nose or end 47 will be in a position to engage the shoulder 48 of the locking plate 24, owing to the fact that the spring 65 is greater in strength, or sufficient to overcome the action of the spring 68 illustrated in Figs. 7, 8 and 9 and Fig. 5. Secured at 71 to the plate 20 is a spring member 72. The portion 73 of the spring 72 is offset at a slight angle to the plate 20, owing to the angled or elbow portion 74 shown plainly in Figs. 7 and 8. The free portion of the spring member 72 terminates in a V-shaped crotch 75, into which a V-shaped arm extension 76 of the locking plate 24 engages, as shown clearly in Figs. 4 and 8. This arm extension 76 is offset to the body of the locking plate 24, as shown in Fig. 4 owing to the angular portion 77.

It will be seen that when the locking plate 24 is moved in the direction of the arrow 37, the V-shaped portion of the arm extension 76 will ride one of the inclined portions of the V-shaped crotch 75, thereby forcing the same away from the plate 20, so that it will engage the tail 79 of the dog 80, which is pivoted at 81. When the crotch 75 engages the tail 79 of the dog 80, the nose or tooth 82 of the dog is thrown out of engagement with the teeth 83 of one of the drive wheels 84 of the totalizer, in order to permit the same to operate (as shown clearly in Fig. 4.) When the wheel 43 best shown in Figs. 4, 7 and 8 is operated partially in the direction of the arrow 86 in Fig. 7, in order to cause the inclined surface or edge 45 to contact with the body 46 of the nose 34, in order to disengage the nose 34 from the arm or lug 35 of the plate 24, the tail 31 of the dog 30 engages any one of the teeth of the power wheel 33 in order to lock the same. When the nose 34 is thus disengaged from the arm or lug 35, the plate 24 is again returned to its normal position against the side of the recess 23 upon the right, thus at the same time reseating the V-shaped portion of the arm extension 76 in the V-shaped crotch 75 of the spring member 72, thus allowing the V-shaped crotch to release the tail 79 of the dog 80, in order to cause the nose or tooth 82 to again engage the teeth 83 of the drive wheel 84 of the totalizer, in order to lock the same, (as best shown in Figs. 4, 7 and 8). Not only does the wheel 43 throw the tail 31 of the dog 30 in engagement with the teeth of the power wheel 32, but also throws the nose or end of the lever arm 36 from the path of the shoulder 48 of the locking plate 24, so as to allow the same to return to its normal position, owing to the inclined raised portion 88 (best shown in Figs. 7 and 8) coming in contact with the nose or end 47 of the lever arm 36.

Mounted loosely upon the shaft 22 is a gear wheel 89, (best seen in Figs. 4, 7 and 8) the teeth of which are engaged by the rack teeth 5 of the rule 3. On one face of the gear wheel 89 an annular series of laterally extending ratchet teeth 90 are provided. A disk wheel 91 (shown best in Fig. 4) rotates on the shaft 22 and has a dog 92 pivoted at 93 thereon. The nose 94 of the dog 92 is designed to engage the teeth 90, in order to cause the disk wheel 91 to rotate with the gear 89, there being a spring 95 for holding the nose of such dog 92 in engagement with said teeth 90. Secured on the shaft 22 by a screw bolt 96 and nut 96ᵃ is a shield plate 97, for protecting and holding the power main spring 98 in place (which structure is best shown in Fig. 4). One end of this power main spring is secured at 99 in any suitable manner to the shaft 22, while the other end is secured at 100 to the disk wheel 91 (Fig. 4). The outer periphery of the disk wheel 91 is provided with ratchet teeth 101, with which a spring retained pawl 102 engages, in order to prevent retrogression of the disk wheel 91, after the power main spring has been wound. As the carriage 2 of the typewriter moves to the left, when pressing the numerical keys of the typewriter, the gear 89 is rotated intermittently to the left, the ratchet teeth 90 slipping by the nose 94 of the dog 92, in which case the pawl 102 (Fig. 4) prevents the disk wheel 91 from rotating backwardly, while the power main spring acts to rotate the shaft 22, and with it the power wheel 32. When moving the carriage to the right, in order to wind the main power spring the nose 94 firmly engages the teeth 90 of the gear 89, so as to cause the disk wheel 91 to rotate with the gear 89, and owing to the fact that one end of the power main spring is connected to the disk wheel 91, the spring will be wound. It will be observed that the power main spring is so constructed and shaped for a short distance of its length, for instance adjacent to where it is fastened to the disk wheel 91, as to engage the tail 104 of the dog 92, so as to throw its nose 94 from engagement with the teeth 90 of the gear 89, when the said spring is finally wound. However, when the power main spring 98 tends to unwind in adding, the peculiarly constructed or wide portion of the spring will free the tail 104 of the dog 92, so as to permit the nose 94 to again engage the teeth 90, whereby the spring may again be wound. By this construction, it will be observed that the power main spring is wound automatically.

A plate 105 (best seen in Fig. 4) is secured in any suitable manner to the shaft 22, as shown at 106, and spaced apart with respect to the plate 20. Journaled in suitable bearings of the plates 20 and 105 are a series of annularly arranged stub shafts 107 (best seen in Figs. 4, 6, 7, 8, 10, 11, 12, 13 and 14), portions of which adjacent the plate 105 are cut away to form notches 108, the purpose of which will be hereinafter set forth. Journaled upon each of said shafts 107 are three gears 109, 110 and 111.

Referring to Fig. 8 of the drawing each of the gears 110 is lettered respectively, beginning from the left to the right. For instance, $a$, $b$, $c$, $d$, $e$, $f$, $g$, $h$, and $k$.

Referring to Fig. 6 of the drawings each of the gears 109 is designated respectively, for instance, $a'$, $b'$, $c'$, $d'$, $e'$, and $f'$, $g'$, $h'$, and $k'$, while the gears 111 in Fig. 7 are designated beginning from the left to the right $a^2$, $b^2$, $c^2$, $d^2$, $e^2$, $f^2$, $g^2$, $h^2$, and $k^2$.

The gears in Fig. 8 respectively lettered are adapted to engage the teeth 112 of the wheel 43, so as to rotate the same in the direction of the arrow 86. However, only one of said gears has to be operated, in order to impart partial motion to the wheel 43. Each of the three gears 109, 110 and 111 rotates as one body, and with each respective shaft 107. The gear wheel $a$ at the left in Fig. 8 in practice is designed to have six teeth, while the gear $b$ is provided with three teeth, whereas the gear wheels $c$ and $d$ are provided with two teeth. The remaining gears $e$, $f$, $g$, $h$ and $k$ only have one tooth apiece. The notches 113 of the wheel 111 in Fig. 7 of the drawings correspond in number to the teeth respectively upon the gear wheels 110, and are designed to be located opposite the teeth of said wheels 110. The shafts 107 are eccentrically arranged, so that when any one of them is rotated its gear wheel 109 will be thrown in mesh with the teeth of the gear 114, which rotates with the shaft 22 and the power wheel 32, and when any one of said gears 109 is thrown in mesh with said gear 114, the remaining gears 109 are held locked, owing to the fact that the series of plates 115 are operated by the lug 116 of the shaft 107 of the certain gear 109, that is thrown in mesh with the gear 114, so as to cause the radial projections 117 to engage the notches 108 of said shafts 107. An arm 118 is secured to each of the shafts 107, whereby the same may be rocked. Connected to said arms, as shown in Figs. 3 and 4 are rods lettered respectively $a^3$, $b^3$, $c^3$, $d^3$, $f^3$, $g^3$, $h^3$ and $k^3$. These rods correspond in their lettered order to the numerical order of the number keys of a typewriter, and when the number one key of the typewriter is depressed, the eccentric shaft 107 having the gear $a'$ is rotated, and when the number key two is depressed, the shaft 107 having the gear $b'$ is rotated, and so on from the left to the right, or rather in any direction. When one of the number keys of the typewriter is operated the remaining keys are held locked, owing to the provision of the locking plates 115.

In depressing the numerical key 3 of the typewriter, all the other keys are locked against being depressed, and this is accomplished in the following manner. It will be observed that the numerical key 3 of the typewriter is connected to its respective shaft 107, by means of the rod $c^4$ shown clearly in Fig. 3 of the drawings. The shaft 107, to which the rod $c^4$ is connected by the crank arm as shown in Fig. 3, is provided with a lug 116, which, when the shaft 107 (which is operated by the numerical key three) is rocked, will strike a lug 115ᵃ, thereby rocking the plate 115 having the lug 115ª. In rocking the plate 115 having the lug 115ª, the portion 115ᵇ of the lug 115ª enters the notch 108 of the shaft to which the numerical key number two is connected by the rod $b^6$, thereby locking the numerical key two. Also in rocking the plate 115 having the lug 115ª cause the lugs 117 respectively to enter each of the notches 108 of the other shaft 107, to which the remaining keys of the typewriter are connected, thereby preventing any of the other keys from being depressed, while the numerical key three is under depression. In following this description of the locking of said key, reference should be had to Figs. 3, 4, 5, 10, 11, 12, 13, and 14. Referring to Fig. 4 particularly it will be seen that there are nine of such plates 115 shown in edge view, whereas it will be seen that Fig. 10 discloses the plate to be operated by the lug 116 of another of said shafts 107, to which the numerical key one is connected, and which plate in Fig. 10 is provided with a lug 115ᶜ, which is contacted with by the lug 116 of one of the shafts 107, thereby causing the lugs 117 to enter the notches 108 of the remaining shafts 107, to lock the remaining keys, that is, when the numerical key one is depressed. Referring to Fig. 11 another of the plates 115 is also constructed with a lug 115ᵈ, to be engaged by a lug 116 of one of the shafts 107, which is rocked by the numerical key number two when depressed, in which case the remaining keys are locked as before stated. When rocking the plate having the lug 115ᵈ the portion 115ᵍ of the lug 115ᵈ enters the notch 108 of the shaft which is rocked by the numerical key one. When depressing the numerical key number four, its respective shaft 107 is rocked, and in rocking, its respective lug 116 contacts with the radial projection or lug 115ʰ, the portion 115ᵏ of which enters the notch 108 of the shaft 107 to which the numerical key three is connected, thereby locking the numerical key three against depression. When locking the numerical key three, the remaining lugs 117 of the plate having the lug 115ʰ enters the other notches 108 respectively of the other shaft 107, thereby locking the remaining keys. The plate 115 shown in Fig. 14 is provided with a radial projection or lug 115ᵐ, which is contacted with by lug 116 of the shaft 107, which is rocked by the numerical key five of the typewriter, thereby rocking the plate 115 shown in Fig. 14 and causing the portion 115ⁿ of the lug 115ᵐ to enter the notch 108 of the shaft 107, to which the numerical key four is connected, thereby locking the numerical key four against actuation. In locking the numerical key 4, by rocking the plate 115 shown in Fig. 14, the lugs 117 of said plate in Fig. 14 enter the notches 108 respectively of the remaining shafts 107, thereby locking the remaining numerical keys. The numerical key 6 may be depressed in a like manner in order that the remaining keys may be locked, and so on with the entire set of numerical keys.

Mounted in brackets 119 (Figs. 4 and 7) of the plates 105 are screws 120, the V or chisel shaped ends of which are designed to engage the notches of the wheels 111, and to prevent said wheels 109, 110 and 111 from turning when out of gear. After a number typewriter key is released, the locking plates 115 are returned to their normal positions as shown in Fig. 5, by means of the spring 121, which is secured at 122. After the wheel 43 has been operated to throw the tail of the dog 30 in engagement with the power wheel 32, the same is returned to its normal position against the lug 123, by means of the spring 124, secured at 125 to the plate 20, as disclosed in Fig. 8. The brackets 119 are secured to the plate 105, by virtue of the screws 126.

Mounted in bearings 127 (best seen in Figs. 3 and 4) of the plate 105 are two shafts 128 and 129, the shaft 129 telescoping within the shaft 128. Rotatable with the lower end of the shaft 128 is a beveled gear 130, adapted to mesh with the beveled gear 131, which rotates with the gears 32 and 114 and the shaft 22, when the shaft 128 is in the position shown in Fig. 3. However, when the shaft 128 is moved downwardly, the gear 130 may be thrown out of mesh, while the gear 133 at the upper end of the shaft 128 may be thrown in gear with the said beveled gear 131, in order to reverse the movement of the beveled gear 134 of the shaft 129 (best seen in Figs. 3 and 4). The beveled gear 134 meshes with a similar beveled gear 135 on the stub shaft 136, which is mounted in bearings 137 of the plate 138. This plate 138 is cut away for the reception of the gear 135ª and the gear 135. The said gear 139 is adapted to mesh with the drive gear 84 of the totalizer, which gear 84 when released from engagement with the dog 80 is operated in one direction or the other through the gears 130 or 133 and the gears 134, 135 and 139. The bearings 127 are provided with inclined portions 140, constituting cams 141 and 142. A forked member or lever 143 is provided with cam collars 144 and 145. The cam collar 145 is arranged above the gear 133, while the cam collar 144 is arranged below the gear 133. Referring more especially to Fig. 3, it will be seen that the cam collar 145 is in engagement with the cam 142, and the cam collar 144 is out of engagement with the cam 141, thereby holding the gear 133 out of mesh with the gear 131, and holding the gear 130 in mesh. When the gears are so meshed the fork lever is arranged as shown in Fig. 3, and to reverse the positions of said gears 130 and 133, the lever 143 may be shifted to the right, and when shifted to the right, the machine is adapted for adding, and when shifted to the left as in Fig. 3, the machine is arranged or adjusted for subtracting. The lower end of the shaft 129 has a thrust bearing in a screw 105$^c$ (Fig. 4), which is mounted in a bracket 105$^a$; said bracket 105$^a$ is fixed to the plate 105 by a screw 105$^b$ (Fig. 4).

The rods $a^3$, $b^3$ and $k^3$ have bell crank and link connections 150 and 151 with the arms 118, instead of being connected direct to the arms 118. The rods $a^3$, $b^3$, $c^3$, $d^3$, $e^3$, $f^3$, $g^3$, $h^3$ and $k^3$ consist of two sections jointed at 152 by the turn buckles. One of the sections of each of said rods is connected to a number key 153, as shown in Fig. 15. Rockable or movable with the shaft 59 are a series of arms 154 arranged in pairs, and having a slot and pin connection 155 with the key bar 153. Each pair of arms 154 has a transverse pin 156, to contact with the short arm 157, which is secured to and rockable with the shaft 59. When a number key, such as 153, is depressed, the pin 156 rocks the arm 157 and the shaft 59, which in turn rocks the lever or arm 57, thereby pulling upon the rod 56, which in turn actuates the lever arm 36, so that the plate 24 will be thrown in the direction of the arrow 37, in order that the dog 30 will unlock the power wheel 32. Upon the actuation of any number key the rod 54 will be actuated in this manner. From now on referring more particularly to Figs. 4, 17 and 18, the totalizer 9 comprises a casing 160, in which the shaft 161 is stationary. This shaft 161 has a flat side so that part of the totalizer will be held stationary on same. To this casing 160 a bar 162 is hinged and is held either perpendicular or against the totalizer 160 whichever the case may be, in or out of gear, by friction with the casing of the totalizer at its hinge connection. When this bar 162 is set perpendicular it will connect with the roller 63 and cause same to be depressed, and the machine will then be in gear ready for adding or subtracting. It is to be noted that the lever dog 162 on the back portion of the totalizer 9 is provided with two notches 162$^a$, so that as the carriage of the typewriter moves toward the left, the roller 63 of the arm or lever 61 will engage one or another of said notches 162$^a$, thereby preventing the lever or arm 61 from being depressed, and when not depressed the mechanism on the plate 20 will not operate, therefore the totalizer will not operate, thereby permitting the operator of the machine to strike a period between the cents column of the totalizer and the units column. However, when the carriage of the typewriter moves sufficiently to the left, after writing and adding numerals in the units, tens and hundreds column of the totalizer, the operator may strike the comma key of the typewriter, without operating said mechanism, owing to the roller 63 coming in registration with another of said notches 162$^a$ of the lever dog 162. The ends of said bar 162 should be tapered off so that said roller will run over it freely. This bar 162 should be just long enough so that when the first gear wheel 84 at the left hand side meshes with the main drive gear wheel 139 the roller 63 and lever 61 will be depressed by bar 162 and the machine will then be in gear ready for adding or subtracting.

Mounted upon the shaft 161 are seven main drive gear wheels 84—seven disk wheels numbering from 166 to 172 inclusive; also seven small gear wheels 165, and seven of the part 177. Then mounted upon one face of the main drive wheels 84 are three pinion wheels 164 which have six cogs each, and mounted upon one face of the part 177 are two pinions 176$^a$ which have six cogs also. The two pinions 176$^a$ should be set opposite of each other and should be set in on the part 177 half the width of the pinions 176$^a$ and every other cog on said pinions 176$^a$ should be cut off even with the part 177 so that the pinions 176$^a$ really have six cogs on one side and three cogs 176$^c$ on the side next to the part 177. The above parts constitute the essential features of a totalizer which add up to 9,999.99. This may be increased or decreased as desired by adding one more of the above parts mentioned. First we place upon the shaft 161 at the extreme right hand end of shaft 161 the gear wheel 165. This first wheel 165 at the extreme right hand end should be stationary on shaft 161 and should be only half the width of the other six of such wheels 165, and the other six wheels 165 to the left should rotate on said shaft 161. Surrounding each wheel 165 is a gear wheel 84 having said pinions 164 meshing with the wheel 165. Journaled on the shaft 161 are the parts or disks 177 which hold the pinions 176 in place. The parts 177 are stationary on the shaft 161, and act to separate the gears 165, and about these separating members or parts 177, the circular bands 166, 167, 168, 169, and 170 having numerals coresponding to the number keys of the typewriter, are arranged, and on the interior of each of the bands adjacent one face of the wheel 84 are cogs, which mesh with the pinions 164, and on the opposite side, there are two sets of cogs 176, opposite each other, forming a notch 175, designed to be engaged by the teeth of the pinions 176$^a$. Each of the disk wheels 166 to 170 rests on two of the cogs of each of the pinions 176$^a$, preventing said pinions 176$^a$ from turning, until one of the two cogs 176 (which forms the notch 175) engages one of the three teeth of the pinion 176$^a$, thereby allowing said pinions 176$^a$ to turn one point.

The pinions 176 mesh with the next wheel 165 and 165 meshes with the pinions of the next main gear wheel 84 and the pinions 164 mesh with the interior of disk wheel 167 and cause same to rotate one point or numeral. On the face of the disk wheels 166 to 172 inclusive are two sets of numerals arranging from 1 to 9 inclusive and including two ciphers. The disk wheel 187 in addition to the numerals is double width and is provided with periods, while the disk wheel 170 in addition to numerals is double width and is provided with commas. This arrangement may be increased or decreased as desired, in other words, after passing the decimal fraction wheel every third wheel in addition to the numerals thereon is provided with commas.

To demonstrate the adding or subtracting mechanism of this machine the totalizer 160 is first set on the rule 3 at the point where the column of figures is to fall, and then set the stops on the typewriter rack to correspond. The bar 162 on the totalizer 160 is then set perpendicular so that it will connect with the roller 63. The lever 143 is moved to the right which will connect bevel gear 133 with large bevel gear 131 which will be for adding. Now the machine is ready to add. Now when a figure key is struck and the carriage of the typewriter is at a point where the column of figures are to fall and added the machine will be automatically in gear, and by striking any one of the nine figure keys will cause said key which is being depressed to operate the arm 154 which in turn rocks the short arm 157 (which is fast on the shaft 59) thereby causing the arm 57 to pull the rod 55 downwardly to unlock the mechanism. All the numerical keys are provided with such connections.

Now in depression key 1 or figure 1 of typewriter it will pull down on the arm 55 which is connected to the figure key 1 and also the arm 55 which is connected to the unlocking mechanism at the extreme right hand side of the figure key nine. In depressing key 1 it pulls down on arm 55 to 54, 54 being connected to 52 and by 152 to 150 to 151 and 151 to 118, and to shaft 107. Shaft 107 being mounted on an eccentric will rotate to the right and cause the wheel $a'$ to be meshed with the large gear 114, and at the same time the lug 116 being connected to shaft 107 will cause said lug 116 to rotate to the right and this will rotate the locking plate 115 to the left and lock all the other keys except the one in operation. The unlocking arm 55 being connected to said key 1 will at the same time operate, being connected to 54 and 54 to 52 to 50 and 50 to unlocking arm 36, and 36 will connect with 48, and 48 will crowd 24 to the left until the point 66 disengages with the point 34 on dog 30, the point 76 on 24 will strike the upper part of point 34 which will cause the lower part 31 of dog 30 to disengage with the power wheel 32 allowing it to rotate freely. The point 75 rests in a V-shaped spring 72 so as the part 24 is being crowded to the left it will crowd in on said spring so that it will strike the lower part of dog 80 and cause said dog 80 to disconnect with the main drive wheel 84 and 84 being meshed with the drive gear 139 will rotate freely. The main drive wheel 84 connected to the disk wheel 166 by the pinions 164 will cause said disk wheel to rotate one point or a count of one, which can be seen through the glass 79. The gear wheel $a'$ of wheels 109 acts as a locking wheel for key 1 which has been operated and allows the power wheel to rotate the required distance depending on the key being depressed. Now in adding 9 to the above 1 the key 9 (which operates in the same manner only meshing locking wheel $k'$ with the large drive wheel 114) is depressed in which case said wheel $k'$ will allow the power wheel 32 to rotate 9 points or the count of nine, while the unlocking arm works in the same way as stated above. Having 1 on the totalizer and having proceeded to add on the units column, the first main drive wheel 84 will mesh with the drive wheel 139. Now this wheel 84 has been rotated one point and nine more will carry the disk wheel 166 so that the two cogs on the left side forming a notch 175 will strike the sixth cog on the pinions 176 while one of the three cogs will enter the notch 175 and said pinions will be rotated and said pinions being meshed with 165 will rotate 165, which being meshed with the pinions 164 of the next wheel 84 and the pinions of the next wheel 84 being meshed with the next disk wheel 167 will cause same to rotate one point, whereby 10 (a total of 9 and 1) will now appear through the glass 79. After adding one column of figures or numerals, second and third columns may be added, and totals of each written, and so on until a series of columns are added. To subtract, it is necessary to move the lever 143 to the left.

It is to be ascertained from the foregoing, that there has been devised a novel, simple and efficient adding and subtracting attachment, particularly adapted for use in connection with the present construction of the standard makes of typewriters, without necessitating re-arrangement of the attending parts, and one which has been found particularly desirable and practical. The part 138 upon each side of the gear 135 extends upwardly even with the teeth $135^a$ of the gear 135, so as to engage between the teeth of the gears 84, excepting the gear 84 which is in mesh with the teeth $135^a$, in order to lock the gears 84 excepting one, which as before stated, is in mesh with the teeth $135^a$.

The disk gear wheel 91, as the carriage of the typewriter is pushed to the right, rotates in the direction of the arrow 96°, thereby winding the spring 98.

The wheels $a'$ to $k'$ are three wheels fastened together as one wheel. In other words, in Fig. 8 there is a gear $a$, and in Fig. 6 a gear $a'$, and these two wheels are fastened upon the same shaft and move as one wheel. This same construction is true in regard to the wheels $b$ and $b'$, $c$ and $c'$, $d$ and $d'$, $e$ and $e'$, $f$ and $f'$, $g$ and $g'$, $h$ and $h'$, and $k$ and $k'$. Fig. 8 shows the first wheels $a$ to $k$ inclusive, in other words, the locking wheels 110. Axially alined with the locking wheels 110 respectively, and on the same shafts, are the gear wheels 111, shown in Fig. 7. These locking wheels are to prevent the sets of wheels, three each, from revolving when out of gear, as each wheel is just in the right position, whereby each of said wheels $a'$ to $k'$ inclusive, as in Fig. 6, will mesh with the gear wheel 114, when a certain key from 1 to 9 is depressed. For instance, should the key 1 (which will mesh the gear wheel $a'$ with the gear wheel 114, Fig. 6, and the machine is unlocked) be depressed, the wheel $a'$ will move the wheel 114 two of its cogs. The reason the wheel 114 moves or turns two cogs is that the wheel $a'$, Fig. 8, only has six cogs or teeth, so that every other cog will catch or engage a cog on the locking device 43 (Fig. 8) which moves in the direction of the arrow 86, thereby causing the machine to be locked on account of the three wheels shown in Figs. 6, 7 and 8, being constructed or fastened together, to move as one body. Referring to Fig. 8, it is to be noticed that the gear wheel $a$ has six teeth or cogs, and being that this wheel $a$ of Fig. 8 is directly behind and practically a part of the gear wheel $a'$ in Fig. 6, it appears as though the gear wheel $a'$ (Fig. 6) has twelve teeth or cogs. When this wheel $a$ (Fig. 8) is thrown to mesh with one of the teeth of the wheel 43, it will rotate one cog or tooth, but this means that the gear wheel $a'$ in Fig. 6 will rotate two cogs. In other words, the gear wheel $a$ (Fig. 8) will have to be depressed six times to make one revolution.

Referring to the gear wheel $b$ (Fig. 8), it is to be observed that it has three teeth or cogs (which act as locking cogs), and being that this wheel $b$ is directly behind and moving practically as a part of the gear wheel $b'$ (Fig. 6) it appears as though said wheel $b'$ also has twelve teeth or cogs. When this wheel $b'$ (Fig. 6) is thrown to mesh with the wheel 114, said gear wheel $b'$ (Fig. 6) will rotate four teeth or cogs, consequently moving the wheel 114 four teeth by reason of the fact that every fourth tooth of said wheel $b'$ is cut away, therefore disclosing each of the three teeth of the gear wheel $b$ (Fig. 8). Hence, when key No. 2 is depressed, thereby throwing the wheels $b$ and $b'$ (which move as one body) to mesh respectively with the wheels 43 and 114, the wheel $b$ will rotate one tooth, while the wheel $b'$ will rotate three teeth or cogs, thereby requiring depressing the key No. 2 three times, to cause said wheel $b$ to make one revolution. The depressing of the key No. 2 will allow the machine to operate two points, by reason of the fact that the machine will lock at every fourth cog or tooth.

The gear wheel $c'$ (Fig. 6) appears to also have twelve teeth or cogs, but in reality it only has ten teeth or cogs, by reason of the fact that where two diametrically opposite teeth, or every sixth tooth should appear, such teeth are cut away, and by reason of the gear wheel $c$ (Fig. 8, which has two teeth or cogs) being behind said wheel $c'$ (Fig. 6), said two teeth or cogs of the gear wheel $c$ (Fig. 8) will appear through and adjacent said cut-away portions, thereby giving the appearance as though the gear wheel $c'$ (Fig. 6) has twelve teeth or cogs, whereby said gear wheel 114 (Fig. 6, which has every fifth tooth cut away, so that each tooth 112 of the gear wheel 43 will appear through and adjacent said cut-away part) will be allowed to rotate six teeth or cogs, or three points.

Referring to the gear wheel $d'$ (Fig. 6) it is to be seen that it is large enough to appear as though it has sixteen teeth or cogs. But every eighth tooth or cog, or two diametrically opposite teeth or cogs are cut-away; therefore, the gear wheel $d$ (Fig. 8, which only has two teeth or cogs) being directly behind the wheel $d'$, said wheel $d'$ appears as having sixteen teeth or cogs. The purpose of this is that twelve is not divisible by eight; therefore, the gear wheel $d'$ (Fig. 6) is large enough to appear as having sixteen teeth or cogs, which will allow the wheel $d'$ to rotate eight teeth or cogs or four points, hence, rotating the wheel 114 correspondingly.

The gear wheel $e'$ (Fig. 6) is constructed smaller, and it appears as having ten teeth or cogs, but where one or the tenth tooth or cog should be, there is a vacancy. Hence, the one tooth or cog of the gear wheel $e$ (Fig. 8) will appear through and adjacent said vacancy or cut-away portion, thereby giving the appearance that the gear wheel $e'$ has ten teeth or cogs, so that the wheel $e'$, when thrown eccentrically into mesh with the gear wheel 114, will make one revolution, and rotate ten teeth or cogs, or five points.

There are twelve teeth or cogs appearing on the gear wheel $f'$ (Fig. 6), but there is a vacancy where the twelfth tooth or cog is cut-away, so that the single tooth or cog of the gear wheel $f$, (Fig. 8) will show through and adjacent this vacancy, making the wheel $f'$ (Fig. 6) as appearing to have twelve teeth or cogs; hence, the gear wheel $f'$ (Fig. 6) will make one complete revolution, and rotate twelve teeth or cogs, or six points, every time said gear wheel $f'$ (Fig. 6) is thrown eccentrically into mesh with said gear wheel 114.

Observing Fig. 6, the gear wheel $g'$ appears as having fourteen teeth or cogs. However, in reality, there are only thirteen teeth or cogs, and where a fourteenth tooth should be, there is a vacancy, through and adjacent which the single tooth or cog of the gear wheel $g$ (Fig. 8) shows, in which case, said gear wheel $g'$ appears as having fourteen teeth or cogs, and makes one complete revolution, or allows the wheel 114 to rotate fourteen teeth or cogs, or seven points. The vacancy on the gear wheel $h'$ (Fig. 6), through and adjacent which the single tooth of the gear wheel $h$ (Fig. 8) shows, makes said wheel $h'$ (Fig. 6) appear as having sixteen teeth, whereby said wheel $h'$ will make one complete revolution, consequently, sixteen teeth of the wheel 114, or eight points. The gear wheel $k'$ (Fig. 6) has a vacancy, so that the single tooth of the gear wheel $k$ (Fig. 8), will show therethrough, and give said wheel $k'$ the appearance as having eighteen teeth or cogs (Fig. 6) whereby said gear wheel $k'$ will make one complete revolution, or rotate said gear wheel 114 eighteen teeth, or nine points.

To render the foregoing clearer or more comprehensive, it is to be understood that said wheels 114 and 33 are fastened together and rotate as one body. One tooth or cog of the wheel 33 equals two of the teeth of the gear wheel 114. Any one of the gear wheels $a'$ to $k'$ (Fig. 6) may be thrown eccentrically into mesh with said gear wheel 114, when its respective key is depressed, and moreover, the wheels $a$ to $k$ (Fig. 8) are fast to the gears $a'$ to $k'$ (Fig. 6) respectively. It is to be noted that said gears or wheels $a$ to $k$ inclusive (Fig. 8) constitute means to control or limit the rotation of said gear 114, as well as controlling each respective key. As any one of said wheels $a$ to $k$ (Fig. 8) is thrown into mesh with said gear 114, the locking cog or tooth passes to the left of the adjacent tooth of the part or gear 43 (Fig. 8), and the gear or wheel (of said gears or wheels $a'$ to $k'$) that has been actuated, turns or rotates until the first tooth or cog of the proper gear of said gears $a$ to $k$ strikes or engages the proper tooth or cog of the gear or part 43 (Fig. 8), thereby operating the locking mechanism, and causing said machine to be locked. It takes two cogs or teeth to make one count for the number key 1 or the gear $a'$ (Fig. 6), and there is a cog or tooth of any one of the gears $a$ to $k$ (Fig. 8) opposite every other cog or tooth, as shown in Fig. 6. For the number key 2, it will require four cogs or teeth, whereby two counts may be made, by reason of the fact that there is one cog on wheel $b$ (Fig. 8) to every four cogs on $b'$ (Fig. 6). The wheel $c'$ (Fig. 6) will turn six cogs by reason of the fact that the gear wheel $c$ (Fig. 8) has two cogs or teeth, or one to every six teeth on the gear $c'$ (Fig. 6), and so on to the ninth number key of the typewriter. The reason that these wheels, as disclosed in Figs. 6 and 8, are not all of the same size is that they have to have even numbers of cogs or teeth, and be as near the same size as possible. While the gear $a'$ (Fig. 6) has to be operated six times to make one revolution, in other words, the number key 1 of the typewriter has to be depressed six times, while the number keys 5 to 9 of the typewriter respectively have to be depressed once to cause their respective gears $e'$ to $k'$ to make one complete revolution respectively. The number keys 3 and 4 require two depressions each to cause their respective gears $c'$ and $d'$ to make one revolution respectively, whereas the number key 2 of the typewriter requires three depressions to cause its respective gear $b'$ to make one revolution.

In the operation, the totalizer is set on the rule, so that the major gear 84 adjacent the disk wheel 172 (which is provided with numbers one to nine inclusive including a cipher) of the million column of the totalizer, engages or meshes with the gear 135ᵃ of the mechanism for operating the totalizer. After the totalizer has been so adjusted, the lever dog 162 is disposed, as shown in full lines in Fig. 4, in order to engage the roller 63 of the lever 61, causing the spring 65 to bear against the lever arm 36 and force the same downwardly against the action of the spring 69, so that when the lever 50 is rocked by the depressing of a key, the angular end 47 of the lever arm 36 will contact with the shoulder 48 of the locking plate 24. Before any of the keys of the typewriter are depressed, the locking plate 24 assumes a position as shown in Fig. 9, with the arm 35 under the nose 34 of the dog 30, the tail 31 of which engages the teeth 32 of the power ratchet wheel 33, which is fast on the tubular shaft or sleeve 22, thereby controlling the movement of the motor. Supposing it is desired to add three, four and five, the numerical key three of the typewriter is depressed. In depressing this key, the rod $c^4$ is not only pulled downwardly, but also the rod 55, by rocking the arm 57, which is fast on the shaft 59. This shaft 59 is rocked by the arm 154 (which has a slot and pin connection at 155 with the numerical key bar 3) owing to the transverse pin 156 contacting with one of the short arms 157, which is fast on the shaft 59. The arms 154 are loose on the shaft 59.

It will be noted that when depressing the numerical key 3, the rod 54 is pulled downwardly, thereby rocking the lever 50, and causing the end 47 to contact with the shoulder 48 of the locking plate 24, and moving the locking plate 24 in such wise as to move the arm 35 from under the nose 34 of the dog 30, reference being had to Fig. 9, in which case the spring 38 acts to tilt the dog 30, removing the tail 31 from the path of the teeth of the ratchet 33, thereby unlocking the tubular shaft or sleeve 22. At the same time this occurs, the rod $c^4$ rocks its respective shaft 107, and owing to the gear $c^1$ being eccentric on the shaft 107 to which the rod $c^4$ is connected, said gear $c^1$ is thrown in mesh with the teeth of the gear 114 (which is fast upon the sleeve or shaft 22,) thereby rotating said shaft 22, and when said gear 114 rotates, the beveled gear 131 is correspondingly rotated, and when in engagement with the beveled gear 133, which is so meshed when addition is being accomplished, rotates said gear 133, thereby operating the shaft 129, which, in turn, operates the major gear 84 of the totalizer adjacent the units column, in order to disclose the numeral 3 through the casing of the totalizer. Just a trifle before the numeral 3 in the units column on the totalizer appears through the casing, one of the teeth of the gear $c$ of the shaft 107 (to which the numerical key is connected) contacts with one of the teeth 112 of the gear 43 and moves it sufficiently to cause the projection 44 to lift the dog 30, thereby throwing the tail 31 of said dog back into engagement with the teeth 32 of the power ratchet wheel 33, thereby controlling the motor. Then the numerical key 4 is depressed, in a manner likewise to the depression of the numerical key three, which will cause the mechanism on the plate 20 to operate the totalizer, so as to disclose the numeral 7 of the units column on the totalizer through the glass in the casing of the totalizer, owing to the gear $d'$ of one of the shafts 107 to which the numerical key 4 is connected, being thrown in mesh with the teeth of the gear 114. When throwing the gear $d'$ in mesh with the teeth of the gear 114, said gear 114 is operated sufficiently to cause the major gear 84 to operate the disk wheel of the units column sufficiently to cause the numeral 7 to appear through the glass of the totalizer. Just before the numeral 7 appears through the glass of the totalizer, one of the teeth of the gear $d$ actuates the gear 43 so as to lift the dog 30 from the path of the arm 35, and throw the tail of the dog 30 back into engagement with the ratchet wheel, thereby locking the mechanism on the plate 20 and controlling the motor. These same cycles of operation are accomplished in adding the numeral five, in which case twelve (the total of three, four and five) will appear through the glass of the totalizer.

The invention having been set forth, what is claimed as new and useful is:—

1. In a calculating attachment for typewriters, the combination of a typewriter having a carriage and a totalizer mounted on the carriage thereof, of a motor, a mechanism controlled by said motor and geared to the totalizer and having connections with the respective number keys of the typewriter, said mechanism having means for automatically locking the motor, said means comprising a power ratchet under tension of the motor, a spring-tensioned dog having its tail engaging a tooth of the ratchet to hold the motor against operation, and a pivoted spring-tensioned plate engaging under the nose of the dog to hold the tail in engagement with the power ratchet against the action of the spring-tensioned means of the dog.

2. In a calculating attachment for typewriters, the combination of a typewriter having a carriage and a totalizer mounted on the carriage thereof, of a motor, a mechanism controlled by said motor and geared to the totalizer and having connections with the respective number of keys of the typewriter, said mechanism having means for automatically locking the motor, said means comprising a power ratchet under tension of the motor, a spring-tensioned dog having its tail engaging a tooth of the ratchet to hold the motor against operation, a pivoted spring-tensioned plate engaging under the nose of the dog to hold the tail in engagement with the power ratchet against the action of the spring-tensioned means of the dog to prevent the motor from operating until a number key of the typewriter is depressed, and means actuated by any one of the number keys and including a reciprocating member to engage said plate to move the same against the action of its spring means out of engagement with the nose of the dog, whereby the spring means of the dog will release the power ratchet, thereby causing the motor to operate the mechanism when a key is depressed to actuate the totalizer.

3. In a calculating attachment for typewriters, the combination of a typewriter having a carriage and a totalizer mounted on the carriage thereof, of a motor, a mechanism controlled by said motor and geared to the totalizer and having connections with the respective number keys of the typewriter, said mechanism having means for automatically locking the motor, said means comprising a power ratchet under tension of the motor, a spring-tensioned dog having its tail engaging a tooth of the ratchet to hold the motor against operation, an oscillatory plate engaging under the nose of the dog, and spring tensioning means for said plate to hold an edge of the plate under the nose of the dog to hold the tail in engagement with the power ratchet against the action of the spring-tensioning means of the dog.

4. In a calculating attachment for typewriters, the combination of a typewriter having a carriage and a totalizer mounted on the carriage thereof, of a motor, a mechanism controlled by said motor and geared to the totalizer and having connections with the respective number keys of the typewriter, said mechanism having means for automatically locking the motor, said means comprising a power ratchet under tension of the motor, a spring-tensioned dog having its tail engaging a tooth of the ratchet to hold the motor against operation, an oscillatory plate engaging under the nose of the dog, spring-tensioning means for said plate to hold an edge of the plate under the nose of the dog to hold the tail in engagement with the power ratchet against the action of the spring-tensioning means of the dog, and means actuated by any one of the number keys and including a reciprocating member engaging said plate to move the same against the action of said spring-tensioning means out of engagement with the nose of the dog, whereby the spring means of the dog will release the power ratchet, thereby causing the motor to operate the mechanism when a key is depressed to actuate the totalizer.

5. In a calculating attachment for typewriters, the combination of a typewriter having a carriage and a totalizer mounted on the carriage thereof, of a motor, a mechanism controlled by said motor and geared to the totalizer and having connections with the respective number keys of the typewriter, said mechanism having means for automatically locking the motor, said means comprising a power ratchet under tension of the motor, a spring-tensioned dog having its tail engaging a tooth of the ratchet to hold the motor against operation, an oscillatory plate engaging under the nose of the dog, spring-tensioning means for said plate to hold an edge of the plate under the nose of the dog to hold the tail in engagement with the power ratchet against the action of the spring-tensioning means of the dog, means actuated by any one of the number keys and including a reciprocating member engaging said plate to move the same against the action of said spring-tensioning means out of engagement with the nose of the dog, whereby the spring means of the dog will release the power ratchet, thereby causing the motor to operate the mechanism when a key is depressed to actuate the totalizer, means bearing upon said reciprocating member, and a device carried by the totalizer to force said last-named means against said member to cause it to engage said plate when reciprocated.

6. In a calculating attachment for typewriters, the combination of a typewriter having a carriage and a totalizer mounted on the carriage thereof, of a motor, a mechanism controlled by said motor and geared to the totalizer and having connections with the respective number keys of the typewriter, said mechanism having means for automatically locking the motor, said means comprising a power ratchet under tension of the motor, a spring-tensioned dog having its tail engaging a tooth of the ratchet to hold the motor against operation, a pivoted spring-tensioned plate engaging under the nose of the dog to hold the tail in engagement with the power ratchet against the action of the spring-tensioning means of the dog to prevent the motor from operating until a number key of the typewriter is depressed, means actuated by any one of the number keys and including a reciprocating member to engage said plate to move the same against the action of its spring means out of engagement with the nose of the dog, whereby the spring means of the dog will release the power ratchet, thereby causing the motor to operate the mechanism when a key is depressed to actuate the totalizer, means bearing upon said reciprocating member, and a device carried by the totalizer to force said last-named means against said member to cause it to engage said plate when the member is reciprocated.

7. In a calculating attachment for typewriters, the combination of a typewriter having a carriage and a totalizer mounted on the carriage thereof, of a motor, a mechanism controlled by said motor and geared to the totalizer and having connections with the respective number keys of the typewriter, said mechanism having means for automatically locking the motor, said means comprising a power ratchet under tension of the motor, a spring-tensioned dog having its tail engaging a tooth of the ratchet to hold the motor against operation, a pivoted spring-tensioned plate engaging under the nose of the dog to hold the tail in engagement with the power ratchet against the action of the spring-tensioning means of the dog to prevent the motor from operating until a number key of the typewriter is depressed, means actuated by any one of the number keys and including a reciprocating member to engage said plate to move the same against the action of its spring means out of engagement with the nose of the dog, whereby the spring means of the dog will release the power ratchet, thereby causing the motor to operate the mechanism when a key is depressed to actuate the totalizer, a pivoted bar having a roller at its extremity and provided with a spring bearing upon said reciprocating member, and a plate carried by the totalizer and having projections corresponding to the seven digits of the number from ten thousands to hundredths of the units of the totalizer to force the spring of the pivoted bar against said reciprocating member to cause it to engage said plate when the member is reciprocated.

8. In a calculating attachment for typewriters, the combination of a typewriter having a carriage and a totalizer mounted on the carriage thereof, of a motor, a mechanism controlled by said motor and geared to the totalizer and adapted to be actuated to operate the totalizer, locking means between the mechanism and the motor, means actuated by any one of the number keys of the typewriter to unlock the locking means, a pivoted device engaging one of the major gears of the totalizer to hold the same against operation, and means actuated by the locking means of the mechanism to actuate said pivoted device to release the totalizer.

9. In a calculating attachment for typewriters, the combination of a typewriter having a carriage and a totalizer mounted on the carriage thereof, of a motor, a mechanism controlled by said motor and geared to the totalizer and having connections with the respective number keys of the typewriter, said mechanism having means for automatically locking the motor, said means comprising a power ratchet under tension of the motor, a spring-tensioned dog having its tail engaging a tooth of the ratchet to hold the motor against operation, an oscillatory plate engaging under the nose of the dog, spring-tensioning means for said plate to hold an edge of the plate under the nose of the dog to hold the tail in engagement with the power ratchet against the action of the spring-tensioning means of the dog, means actuated by any one of the number keys and including a reciprocating member engaging said plate to move the same against the action of said spring-tensioning means out of engagement with the nose of the dog, whereby the spring means of the dog will release the power ratchet, thereby causing the motor to operate the mechanism when a key is depressed to actuate the totalizer, means bearing upon said reciprocating member, a device carried by the totalizer to force said last-named means against said member to cause it to engage said plate when reciprocated, a pivoted element engaging each of the major gears of the totalizer, a tension device, means carried by the oscillatory plate to actuate said tension device to cause said tension device to actuate the pivoted element to release it from engagement with the major gear of the totalizer, to permit the totalizer to operate.

10. In a calculating attachment for typewriters, the combination of a typewriter having a carriage and a totalizer mounted on the carriage thereof, of a motor, a mechanism controlled by said motor and geared to the totalizer and having connections with the respective number keys of the typewriter, said mechanism having means for automatically locking the motor, said means comprising a power ratchet under tension of the motor, a spring-tensioned dog having its tail engaging a tooth of the ratchet to hold the motor against operation, a pivoted spring-tensioned plate engaging under the nose of the dog to hold the tail in engagement with the power ratchet against the action of the spring-tensioned means of the dog to prevent the motor from operating until a number key of the typewriter is depressed, means actuated by any one of the number keys and including a reciprocating member to engage said plate to move the same against the action of its spring means out of engagement with the nose of the dog, whereby the spring means of the dog will release the power ratchet, thereby causing the motor to operate the mechanism when a key is depressed to actuate the totalizer, an oscillatory dog having its nose engaging a major gear of the totalizer, a spring bar, and means carried by the said pivoted plate to actuate said spring bar to cause it to engage the tail of the last-named dog to oscillate the same to draw the nose from engagement with the major gear of the totalizer, thereby releasing the totalizer.

11. In a calculating attachment for typewriters, the combination of a typewriter having a carriage and a totalizer mounted on the carriage thereof, of a motor, a mechanism controlled by said motor and geared to the totalizer and having connections with the respective number keys of the typewriter, said mechanism having means for automatically locking the motor, said means comprising a power ratchet under tension of the motor, a spring-tensioned dog having its tail engaging a tooth of the ratchet to hold the motor against operation, an oscillatory plate spring-tensioning means for said plate to hold an edge of the plate under the nose of the dog to hold the tail in engagement with the power ratchet against the action of the spring-tensioning means of the dog, an oscillatory dog having its nose engaging a major gear of the totalizer, a spring bar, said oscillatory plate having a projection actuating said spring bar against the tail of the last-named dog to oscillate the same to draw the nose from engagement with the major gear of the totalizer, thereby releasing the totalizer.

12. In a calculating attachment for typewriters, the combination of a typewriter having a carriage and a totalizer mounted upon the carriage thereof, of a mechanism connected to the number keys of the typewriter to be set in operative position thereby, means to actuate the totalizer when engaged with said mechanism, a locking mechanism for the first-named mechanism, an oscillatory plate to unlock the locking mechanism, said plate having a projection, oscillatory dogs having their noses engaging the teeth of the major gear of the totalizer, and a spring bar actuated by the projection of said plate so as to engage the tail of any one dog whereby its nose is withdrawn from its respective major gear of the totalizer.

13. In a calculating attachment for typewriters, the combination of a typewriter having a carriage and a totalizer mounted upon the carriage thereof, of a mechanism connected to the number keys of the typewriter to be set in operative position thereby, means to actuate the totalizer when engaged with said mechanism, a locking mechanism for the first-named mechanism, an oscillatory plate to unlock the locking mechanism, said plate having a projection, oscillatory dogs having their noses engaging the teeth of the major gear of the totalizer, a spring bar actuated by the projection of said plate so as to engage the tail of any one dog whereby its nose is withdrawn from its respective major gear of the totalizer, means actuated by any one of the number keys for operating said oscillatory plate to unlock the locking mechanism, and means actuated by a member on the totalizer for depressing the last-named means whereby it may actuate said plate.

14. In a calculating attachment for typewriters, the combination of a typewriter having a carriage and a totalizer mounted upon the carriage thereof, of a mechanism actuated by the number keys of the typewriter to actuate the totalizer, a locking dog for said mechanism, a plate to be actuated to operate the dog to release the mechanism, a plurality of dogs, each having its nose engaging the teeth of a major gear of the totalizer, a spring bar, and an element carried by the plate to actuate the spring bar against the tail of any one of the plurality of dogs to withdraw its nose from its respective major gear of the totalizer.

15. In a calculating attachment for typewriters, the combination of a typewriter having a carriage and a totalizer mounted on the carriage thereof, of a motor, a mechanism controlled by said motor and geared to the totalizer and having connections with the respective number keys of the typewriter, said mechanism having means for automatically locking the motor, said means comprising a power ratchet under tension of the motor, a spring-tensioned dog having its tail engaging a tooth of the ratchet to hold the motor against operation, an oscillatory plate engaging under the nose of the dog, spring-tensioning means for said plate to hold an edge of the plate under the nose of the dog to hold the tail in engagement with the power ratchet against the action of the spring-tensioning means of the dog, said dog having means to engage said plate to hold the same actuated.

16. In a calculating attachment for typewriters, the combination of a typewriter having a carriage and a totalizer mounted on the carriage thereof, of a motor, a mechanism controlled by said motor and geared to the totalizer and having connections with the respective number keys of the typewriter, said mechanism having means for automatically locking the motor, said means comprising a power ratchet under tension of the motor, a spring-tensioned dog having its tail engaging a tooth of the ratchet to hold the motor against operation, an oscillatory plate engaging under the nose of the dog, spring-tensioning means for said plate to hold an edge of the plate under the nose of the dog to hold the tail in engagement with the power ratchet against the action of the spring-tensioning means of the dog, said dog having means to engage said plate to hold the same actuated, said mechanism including a rocking element to cam against the nose of the dog to disengage said means of the dog from the plate and restore the tail of the dog into engagement with the power ratchet.

17. In a calculating attachment for typewriters, the combination of a typewriter having a carriage and a totalizer mounted on the carriage thereof, of a motor, a mechanism controlled by said motor and geared to the totalizer and having connections with the respective number keys of the typewriter, said mechanism having means for automatically locking the motor, said means comprising a power ratchet under tension of the motor, a spring-tensioned dog having its tail engaging a tooth of the ratchet to hold the motor against operation, an oscillatory plate engaging under the nose of the dog, spring-tensioning means for said plate to hold an edge of the plate under the nose of the dog to hold the tail in engagement with the power ratchet against the action of the spring-tensioning means of the dog, means actuated by any one of the number keys and including a reciprocating member engaging said plate to move the same against the action of said spring-tensioning means out of engagement with the nose of the dog, whereby the spring means of the dog will release the power ratchet, thereby causing the motor to operate the mechanism when a key is depressed to actuate the totalizer, said dog having means to engage said plate to hold the same actuated.

18. In a calculating attachment for typewriters, the combination of a typewriter having a carriage and a totalizer mounted on the carriage thereof, of a motor, a mechanism controlled by said motor and geared to the totalizer and having connections with the respective number keys of the typewriter, said mechanism having means for automatically locking the motor, said means comprising a power ratchet under tension of the motor, a spring-tensioned dog having its tail engaging a tooth of the ratchet to hold the motor against operation, an oscillatory plate engaging under the nose of the dog, spring-tensioning means for said plate to hold an edge of the plate under the nose of the dog to hold the tail in engagement with the power ratchet against the action of the spring-tensioning means of the dog, means actuated by any one of the number keys and including a reciprocating member engaging said plate to move the same against the action of said spring-tensioning means out of engagement with the nose of the dog, whereby the spring means of the dog will release the power ratchet, thereby causing the motor to operate the mechanism when a key is depressed to actuate the totalizer, said dog having means to engage said plate to hold the same actuated, said mechanism including a rocking device to cam against the nose of the dog to disengage said means of the dog from the plate and restore the tail of the dog into engagement with the power ratchet.

19. In a calculating attachment for typewriters, the combination of a typewriter having a carriage and a totalizer mounted on the carriage thereof, of a motor, a mechanism controlled by said motor and geared to the totalizer and having connections with the respective number keys of the typewriter, said mechanism having means for automatically locking the motor, said means comprising a power ratchet under tension of the motor, a spring-tensioned dog having its tail engaging a tooth of the ratchet to hold the motor against operation, an oscillatory plate engaging under the nose of the dog, spring-tensioning means for said plate to hold an edge of the plate under the nose of the dog to hold the tail in engagement with the power ratchet against the action of the spring-tensioning means of the dog, means actuated by any one of the number keys and including a reciprocating member engaging said plate to move the same against the action of said spring-tensioning means out of engagement with the nose of the dog, whereby the spring means of the dog will release the power ratchet, thereby causing the motor to operate the mechanism when a key is depressed to actuate the totalizer, means bearing upon said reciprocating member, a device carried by the totalizer to force said last-named means against said member to cause it to engage said plate when reciprocated, said dog having means to engage said plate to hold the plate actuated.

20. In a calculating attachment for typewriters, the combination of a typewriter having a carriage and a totalizer mounted on the carriage thereof, of a motor, a mechanism controlled by said motor and geared to the totalizer and having connections with the respective number keys of the typewriter, said mechanism having means for automatically locking the motor, said means comprising a power ratchet under tension of the motor, a spring-tensioned dog having its tail engaging a tooth of the ratchet to hold the motor against operation, an oscillatory plate engaging under the nose of the dog, spring-tensioning means for said plate to hold an edge of the plate under the nose of the dog to hold the tail in engagement with the power ratchet against the action of the spring-tensioning means of the dog, means actuated by any one of the number keys and including a reciprocating member engaging said plate to move the same against the action of said spring-tensioning means out of engagement with the nose of the dog, whereby the spring means of the dog will release the power ratchet, thereby causing the motor to operate the mechanism when a key is depressed to actuate the totalizer, means bearing upon said reciprocating member, a device carried by the totalizer to force said last-named means against said member to cause it to engage said plate when reciprocated, said dog having means to engage said plate to hold the plate actuated, said mechanism including a rocking element to cam against the nose of the dog to disengage said means of the dog from the plate and restore the tail of the dog into engagement with the power ratchet.

21. In a calculating attachment for typewriters, the combination of a typewriter having a carriage and a totalizer mounted on the carriage thereof, of a motor, a mechanism controlled by said motor and geared to the totalizer and having connections with the respective number keys of the typewriter, said mechanism having means for automatically locking the motor, said means comprising a power ratchet under tension of the motor, a spring-tensioned dog having its tail engaging a tooth of the ratchet to hold the motor against operation, a pivoted spring-tensioned plate engaging under the nose of the dog to hold the tail in engagement with the power ratchet against the action of the spring-tensioning means of the dog to prevent the motor from operating until a number key of the typewriter is depressed, means actuated by any one of the number keys and including a reciprocating member to engage said plate to move the same against the action of its spring means out of engagement with the nose of the dog, whereby the spring means of the dog will release the power ratchet, thereby causing the motor to operate the mechanism when a key is depressed to actuate the totalizer, means bearing upon said reciprocating member, a device carried by the totalizer to force said last-named means against said member to cause it to engage said plate when the member is reciprocated, the nose portion of said dog having means to engage said plate to hold the same actuated, said mechanism including a rocking device to cam against the nose of said dog to disengage said means of the nose of the dog from the plate and restore the tail of the dog into engagement with the power ratchet.

22. In a calculating attachment for typewriters, the combination of a typewriter having a carriage and a totalizer mounted on the carriage thereof, of a motor, a mechanism controlled by said motor and geared to the totalizer and having connections with the respective number keys of the typewriter, said mechanism having means for automatically locking the motor, said means comprising a power ratchet under tension of the motor, a spring-tensioned dog having its tail engaging a tooth of the ratchet to hold the motor against operation, a pivoted spring-tensioned plate engaging under the nose of the dog to hold the tail in engagement with the power ratchet against the action of the spring-tensioned means of the dog, the nose portion of said dog having means to engage said plate to hold the same actuated, said mechanism having a rocking device to cam against the nose of the dog to disengage the means of the nose of the dog from the plate and restore the tail of the dog into engagement with the power ratchet.

23. In a calculating attachment for typewriters, the combination of a typewriter having a carriage and a totalizer mounted on the carriage thereof, of a mechanism for operating said totalizer, said mechanism comprising a power ratchet, a major gear movable therewith, a bevel gear movable with the major gear, a vertical shaft having gear connections with the major gears of the totalizer and having a bevel gear designed to engage the teeth of the first bevel gear, a sleeve on said vertical shaft having a bevel gear designed to mesh with the first bevel gear at a point diametrically opposite the second bevel gear, and means for shifting the last-mentioned bevel gears, whereby one or the other may mesh with the first bevel gear, so that the mechanism may actuate the totalizer to add or subtract.

24. In a calculating attachment for typewriters, the combination of a typewriter having a carriage and a totalizer mounted on the carriage thereof, of a mechanism for operating said totalizer, said mechanism comprising a power ratchet, a major gear movable therewith, a bevel gear movable with the major gear, means geared to the major gears of the totalizer and having a pair of bevel gears designed to engage the first bevel gear at diametrically opposite points thereof, means for shifting first one and then the other of said last-mentioned bevel gears into or out of mesh with the first bevel gear, so that the mechanism may actuate the totalizer to add or subtract, a multiple of eccentrically rocking members, one or the other of which is actuated eccentrically to mesh with the major gear, and means connecting each respective member and each respective number key of the typewriter, whereby said members are thrown into mesh with the major gear, and means whereby as any one of said members is actuated the major gear will actuate the totalizer, to add or subtract a predetermined number according to the key depressed.

25. In a calculating attachment for typewriters, the combination of a typewriter having a carriage and a totalizer mounted on the carriage thereof, of a mechanism for operating said totalizer, said mechanism comprising a power ratchet, a major gear movable therewith, a bevel gear movable with the major gear, means geared to the major gears of the totalizer and having a pair of bevel gears designed to engage the first bevel gear at diametrically opposite points thereof, means for shifting first one and then the other of said last-mentioned bevel gears into or out of mesh with the first bevel gear, so that the mechanism may actuate the totalizer to add or subtract, a multiple of eccentrically rocking members, one or the other of which is actuated eccentrically to mesh with the major gear, and means connecting each respective member and each respective number key of the typewriter, whereby said members are thrown into mesh with the major gear, means whereby as any one of said members is actuated the major gear will actuate the totalizer, to add or subtract a predetermined number according to the key depressed, means for yieldably locking each respective member, and independent locking means comprising a plurality of elements any one of which is designed to be actuated by the member that may be actuated, for simultaneously locking the remaining members.

26. In a calculating attachment for typewriters, the combination of a typewriter having a carriage and a totalizer mounted on the carriage thereof, of a mechanism for operating said totalizer and geared thereto, said mechanism comprising a major gear, a multiple of eccentrically rocking gears, one or the other of which is actuated eccentrically to mesh with the major gear, and means connecting each respective gear and each respective number key of the typewriter, whereby said gears may be thrown into mesh with the major gear.

27. In a calculating attachment for typewriters, the combination of a typewriter having a carriage and a totalizer mounted on the carriage thereof, of a mechanism for operating said totalizer and geared thereto, said mechanism comprising a major gear, a multiple of eccentrically rocking members, one or the other of which is actuated eccentrically to mesh with the major gear, means connecting each respective member and each respective number key of the typewriter, whereby said members may be thrown into mesh with the major gear, each of said members including a shaft, a plurality of elements, and means carried by each shaft of each member to actuate any one of said elements to lock the element into engagement with the remaining shafts simultaneously, thereby locking the remaining keys of the typewriter.

28. In a calculating attachment for typewriters, the combination of a typewriter having a carriage and a totalizer mounted on the carriage thereof, of a mechanism for operating said totalizer and geared thereto, said mechanism comprising a major gear, a multiple of eccentrically rocking members, one or the other of which is actuated eccentrically to mesh with the major gear, means connecting each respective member and each respective number key of the typewriter, whereby said members may be thrown into mesh with the major gear, and means whereby as any one of said members is actuated the major gear will actuate the totalizer to add or subtract a predetermined number according to the key depressed.

29. In a calculating attachment for typewriters, the combination of a typewriter having a carriage and a totalizer mounted on the carriage thereof, of a mechanism for operating said totalizer and geared thereto, said mechanism comprising a major gear, a multiple of shafts, each having eccentrically mounted enlargements provided with a notch and a member adapted to be thrown eccentrically into mesh with the major gear, a plurality of elements having projections to engage said notches, and means carried by each eccentric enlargement to actuate any one of said elements to cause the projections to engage the notches of the remaining enlargements, thereby preventing the other shafts from being actuated.

30. In a calculating attachment for typewriters, the combination of a typewriter having a carriage and a totalizer mounted on the carriage thereof, of a mechanism for operating said totalizer and geared thereto, said mechanism comprising a major gear, a multiple of shafts, each having eccentrically mounted enlargements provided with a notch and a member adapted to be thrown eccentrically into mesh with the major gear, a plurality of elements having projections to engage said notches, means carried by each eccentric enlargement to actuate any one of said elements to cause the projections to engage the notches of the remaining enlargements, thereby preventing the other shafts from being actuated, and means connecting each respectively shaft and each respective number key of the typewriter, whereby as any particular key is depressed the respective member is thrown into mesh with the major gear.

31. In a calculating attachment for typewriters, the combination of a typewriter having a carriage and a totalizer mounted on the carriage thereof, of a mechanism for operating said totalizer and geared thereto, said mechanism comprising a major gear, a multiple of shafts, each having eccentrically mounted enlargements provided with a notch and a member adapted to be thrown eccentrically into mesh with the major gear, a plurality of elements having projections to engage said notches, means carried by each eccentric enlargement to actuate any one of said elements to cause the projections to engage the notches of the remaining enlargements, thereby preventing the other shafts from being actuated, means connecting each respective shaft and each respective number key of the typewriter, whereby as any particular key is depressed the respective member is thrown into mesh with the major gear, and means whereby as any one of said members meshes with the major gear said major gear will actuate the totalizer to add or subtract a predetermined number according to the key depressed.

32. In a calculating attachment for typewriters, the combination of a typewriter having a carriage and a totalizer mounted on the carriage thereof, of a mechanism geared to and operating the totalizer, said mechanism having a power ratchet and a major gear, a multiple of eccentrically rocking members, one or the other of which may be thrown eccentrically to mesh with the major gear, means connecting each respective member and each respective number key of the typewriter, whereby any one of said members may be thrown into mesh with the major gear, a locking dog for the ratchet, an oscillatory plate engaging the nose of the dog to hold its tail in engagement with the ratchet, and means actuated by any number key of the typewriter to oscillate the plate to disengage the tail of the dog from the ratchet.

33. In a calculating attachment for typewriters, the combination of a typewriter having a carriage and a totalizer mounted on the carriage thereof, of a mechanism geared to and operating the totalizer, said mechanism having a power ratchet and a major gear, a multiple of eccentrically rocking members, one or the other of which may be thrown eccentrically to mesh with the major gear, means connecting each respective member and each respective number key of the typewriter, whereby any one of said members may be thrown into mesh with the major gear, a locking dog for the ratchet, an oscillatory plate engaging the nose of the dog to hold its tail in engagement with the ratchet, means actuated by any number key of the typewriter to oscillate the plate to disengage the tail of the dog from the ratchet, the nose of the dog having means to engage the plate to hold it actuated.

34. In a calculating attachment for typewriters, the combination of a typewriter having a carriage and a totalizer mounted on the carriage thereof, of a mechanism geared to and operating the totalizer, said mechanism having a power ratchet and a major gear, a multiple of eccentrically rocking members, one or the other of which may be thrown eccentrically to mesh with the major gear, means connecting each respective member and each respective number key of the typewriter, whereby any one of said members may be thrown into mesh with the major gear, a locking dog for the ratchet, an oscillatory plate engaging the nose of the dog to hold its tail in engagement with the ratchet, means actuated by any number key of the typewriter to oscillate the plate to disengage the tail of the dog from the ratchet, the nose of the dog having means to engage the plate to hold it actuated, said mechanism having a rocking device, and means carried by each member designed to actuate said rocking device simultaneously with the completing of a revolution of the member to cause the device to cam under the nose of the dog and disengage the nose from the plate and restore the tail of the dog into engagement with the power ratchet according to the key depressed.

In testimony whereof I have signed my name to this specification in the presence of two subscribing witnesses.

OSCAR A. DIETSCHE.

Witnesses:
C. C. TURNER,
JACOB KRIER.

Copies of this patent may be obtained for five cents each, by addressing the "Commissioner of Patents, Washington, D. C."